(12) United States Patent  
DeMartino et al.

(10) Patent No.: US 11,807,570 B2  
(45) Date of Patent: Nov. 7, 2023

(54) GLASS ARTICLES AND METHODS FOR IMPROVING THE RELIABILITY OF GLASS ARTICLES

(71) Applicant: CORNING INCORPORATED, Corning, NY (US)

(72) Inventors: Steven Edward DeMartino, Painted Post, NY (US); Adam James Ellison, Corning, NY (US); Kyle Christopher Hoff, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 346 days.

(21) Appl. No.: 17/115,123

(22) Filed: Dec. 8, 2020

(65) Prior Publication Data

US 2021/0087103 A1 Mar. 25, 2021

Related U.S. Application Data

(62) Division of application No. 15/508,815, filed as application No. PCT/US2015/048592 on Sep. 4, 2015, now Pat. No. 10,899,659.

(Continued)

(51) Int. Cl.
*B65D 1/02* (2006.01)
*C03C 15/00* (2006.01)

(Continued)

(52) U.S. Cl.
CPC ............. *C03C 15/00* (2013.01); *A61J 1/1468* (2015.05); *B65D 1/0207* (2013.01); *C03C 23/0095* (2013.01)

(58) Field of Classification Search
CPC ............................. C03C 17/003; C03C 17/005

(Continued)

(56) References Cited

U.S. PATENT DOCUMENTS 2,106,744 A 2/1938 Hood et al.
2,691,548 A 10/1954 Feucht et al.

(Continued)

FOREIGN PATENT DOCUMENTS

CA 853121 A 10/1970
CN 1060861 A 5/1992

(Continued)

OTHER PUBLICATIONS

Final Office Action dated Mar. 12, 2021, for U.S. Appl. No. 15/337,695, filed Oct. 28, 2016. pp. 1-23.

(Continued)

*Primary Examiner* — Michael C Romanowski
(74) *Attorney, Agent, or Firm* — DINSMORE & SHOHL LLP

(57) ABSTRACT

According to one embodiment, a glass article may include a glass body having a first surface and a second surface opposite the first surface. The first surface of the glass body may be etched to a depth less than or equal to about 25% of the maximum initial flaw depth $A_i$ of a flaw population present in the first surface. The flaw population of the first surface is etched to selectively remove material adjacent to each flaw of the flaw population along the maximum initial flaw depth $A_i$. When the glass article is under uniaxial compressive loading, at least a portion of the first surface is in tension and a uniaxial compressive strength of the glass article is greater than or equal to 90% of a uniaxial compressive strength of a flaw-free glass article.

9 Claims, 12 Drawing Sheets

Related U.S. Application Data

(60) Provisional application No. 62/046,208, filed on Sep. 5, 2014.

(51) Int. Cl.
 *C03C 23/00* (2006.01)
 *A61J 1/14* (2023.01)

(58) Field of Classification Search
 USPC .............................................. 428/34.1–36.92
 See application file for complete search history.

(56) References Cited

U.S. PATENT DOCUMENTS

| | | | |
|---|---|---|---|
| 2,753,304 | A | 7/1956 | Orozco |
| 3,023,139 | A | 2/1962 | Tetterode |
| 3,031,095 | A * | 4/1962 | Loughran .......... B65D 23/0892 |
| | | | 215/396 |
| 3,058,177 | A | 10/1962 | Taylor et al. |
| 3,287,311 | A | 11/1966 | Edwards |
| 3,323,889 | A | 6/1967 | Carl et al. |
| 3,441,432 | A | 4/1969 | Levene |
| 3,577,256 | A | 5/1971 | Benford, Jr. et al. |
| 3,607,186 | A | 9/1971 | Bognar |
| 3,674,690 | A | 7/1972 | Clow et al. |
| 3,753,840 | A * | 8/1973 | Plumat ................. C03B 29/025 |
| | | | 65/106 |
| 3,772,061 | A | 11/1973 | McCoy et al. |
| 3,772,135 | A | 11/1973 | Hara et al. |
| 3,779,732 | A | 12/1973 | Spanoudis |
| 3,801,361 | A | 4/1974 | Kitaj |
| 3,811,921 | A | 5/1974 | Crawford et al. |
| 3,844,754 | A | 10/1974 | Grubb et al. |
| 3,876,410 | A | 4/1975 | Scholes |
| 3,878,960 | A | 4/1975 | Jonsson |
| 3,900,329 | A | 8/1975 | Grubb et al. |
| 3,967,995 | A | 7/1976 | Fabianic |
| 3,989,864 | A | 11/1976 | Hey et al. |
| 4,021,218 | A | 5/1977 | Watanabe |
| 4,030,904 | A | 6/1977 | Battye et al. |
| 4,056,208 | A | 11/1977 | Prejean |
| 4,056,651 | A | 11/1977 | Scola |
| 4,065,317 | A | 12/1977 | Baak et al. |
| 4,065,589 | A | 12/1977 | Lenard et al. |
| 4,086,373 | A | 4/1978 | Tobias et al. |
| 4,093,759 | A | 6/1978 | Otsuki et al. |
| 4,130,677 | A | 12/1978 | Huntsberger |
| 4,161,556 | A | 7/1979 | Lenard et al. |
| 4,164,402 | A | 8/1979 | Watanabe |
| 4,214,886 | A | 7/1980 | Shay et al. |
| 4,215,165 | A | 7/1980 | Gras et al. |
| 4,238,041 | A | 12/1980 | Jönsson et al. |
| 4,264,658 | A | 4/1981 | Tobias et al. |
| 4,280,944 | A | 7/1981 | Saito et al. |
| 4,315,573 | A | 2/1982 | Bradley et al. |
| 4,395,527 | A | 7/1983 | Berger |
| 4,431,692 | A | 2/1984 | Hofmann et al. |
| 4,558,110 | A | 12/1985 | Lee |
| 4,595,548 | A | 6/1986 | St. Clair et al. |
| 4,603,061 | A | 7/1986 | St. Clair et al. |
| 4,620,985 | A | 11/1986 | Goodburn et al. |
| 4,636,411 | A | 1/1987 | Dubois et al. |
| 4,654,235 | A | 3/1987 | Effenberger et al. |
| 4,680,373 | A | 7/1987 | Gallagher et al. |
| 4,689,085 | A | 8/1987 | Plueddemann |
| 4,696,994 | A | 9/1987 | Nakajima et al. |
| 4,748,228 | A | 5/1988 | Shoji et al. |
| 4,749,614 | A | 6/1988 | Andrews et al. |
| 4,767,414 | A | 8/1988 | Williams et al. |
| 4,778,727 | A | 10/1988 | Tesoro et al. |
| 4,842,889 | A | 6/1989 | Hu et al. |
| 4,860,906 | A | 8/1989 | Pellegrini et al. |
| 4,870,034 | A | 9/1989 | Kiefer |
| 4,880,895 | A | 11/1989 | Higashi et al. |
| 4,882,210 | A | 11/1989 | Romberg et al. |
| 4,902,106 | A | 2/1990 | Dijon et al. |
| 4,931,539 | A | 6/1990 | Hayes |
| 4,961,996 | A | 10/1990 | Carre et al. |
| 4,983,255 | A | 1/1991 | Gruenwald et al. |
| 4,988,288 | A | 1/1991 | Melgaard |
| 5,002,359 | A | 3/1991 | Sayegh |
| 5,036,145 | A | 7/1991 | Echterling et al. |
| 5,037,701 | A | 8/1991 | Carre et al. |
| 5,049,421 | A | 9/1991 | Kosh |
| 5,112,658 | A | 5/1992 | Skutnik et al. |
| 5,114,757 | A | 5/1992 | Linde et al. |
| 5,120,341 | A | 6/1992 | Nozawa et al. |
| 5,124,618 | A | 6/1992 | Ohtaka et al. |
| 5,137,751 | A | 8/1992 | Burgess et al. |
| 5,230,429 | A | 7/1993 | Etheredge, III |
| 5,246,782 | A | 9/1993 | Kennedy et al. |
| 5,251,071 | A | 10/1993 | Kusukawa et al. |
| 5,252,703 | A | 10/1993 | Nakajima et al. |
| 5,258,487 | A | 11/1993 | Okinoshima et al. |
| 5,281,690 | A | 1/1994 | Flaim et al. |
| 5,286,527 | A | 2/1994 | Blum et al. |
| 5,306,537 | A | 4/1994 | Gustafson et al. |
| 5,310,862 | A | 5/1994 | Nomura et al. |
| 5,326,601 | A | 7/1994 | Kawano et al. |
| 5,403,700 | A | 4/1995 | Heller et al. |
| 5,476,692 | A | 12/1995 | Ellis et al. |
| 5,482,768 | A | 1/1996 | Kawasato et al. |
| 5,488,092 | A | 1/1996 | Kausch et al. |
| 5,498,758 | A | 3/1996 | Scholes et al. |
| 5,504,830 | A | 4/1996 | Ngo et al. |
| 5,594,231 | A | 1/1997 | Pellicori et al. |
| 5,601,905 | A | 2/1997 | Watanabe et al. |
| 5,633,079 | A | 5/1997 | Shoshi et al. |
| 5,736,476 | A | 4/1998 | Watzke et al. |
| 5,756,144 | A | 5/1998 | Wolff et al. |
| 5,792,327 | A * | 8/1998 | Belscher ................. C03C 17/09 |
| | | | 204/192.15 |
| 5,804,317 | A * | 9/1998 | Charrue ................. C03C 21/00 |
| | | | 65/30.14 |
| 5,849,369 | A | 12/1998 | Ogawa |
| 5,851,200 | A | 12/1998 | Higashikawa et al. |
| 5,851,366 | A * | 12/1998 | Belscher ................. C03C 15/00 |
| | | | 204/192.15 |
| 5,908,542 | A | 6/1999 | Lee et al. |
| 5,916,632 | A | 6/1999 | Mishina et al. |
| 5,938,919 | A | 8/1999 | Najafabadi |
| 6,013,333 | A | 1/2000 | Carson et al. |
| 6,046,758 | A | 4/2000 | Brown et al. |
| 6,048,911 | A | 4/2000 | Shustack et al. |
| 6,084,034 | A | 7/2000 | Miyama et al. |
| 6,096,432 | A | 8/2000 | Sakaguchi et al. |
| 6,156,399 | A | 12/2000 | Spallek et al. |
| 6,156,435 | A | 12/2000 | Gleason et al. |
| 6,200,658 | B1 | 3/2001 | Walther et al. |
| 6,204,212 | B1 | 3/2001 | Kunert et al. |
| 6,214,429 | B1 | 4/2001 | Zou et al. |
| 6,232,428 | B1 | 5/2001 | Deets et al. |
| 6,277,950 | B1 | 8/2001 | Yang et al. |
| 6,346,315 | B1 | 2/2002 | Sawatsky |
| 6,358,519 | B1 | 3/2002 | Waterman |
| 6,444,783 | B1 | 9/2002 | Dodd et al. |
| 6,472,068 | B1 | 10/2002 | Glass et al. |
| 6,482,509 | B2 | 11/2002 | Buch-Rasmussen et al. |
| 6,537,626 | B1 | 3/2003 | Spallek et al. |
| 6,561,275 | B2 | 5/2003 | Glass et al. |
| 6,586,039 | B2 | 7/2003 | Heinz et al. |
| 6,599,594 | B1 | 7/2003 | Walther et al. |
| 6,627,377 | B1 | 9/2003 | Itatani et al. |
| 6,737,105 | B2 | 5/2004 | Richard |
| 6,797,396 | B1 | 9/2004 | Liu et al. |
| 6,815,720 | B2 | 11/2004 | Kobayashi et al. |
| 6,818,576 | B2 | 11/2004 | Ikenishi et al. |
| 6,852,393 | B2 | 2/2005 | Gandon |
| 6,866,158 | B1 | 3/2005 | Sommer et al. |
| 6,921,788 | B1 | 7/2005 | Izawa et al. |
| 6,939,819 | B2 | 9/2005 | Usui et al. |
| 6,989,181 | B2 | 1/2006 | Brandt |
| 7,087,307 | B2 | 8/2006 | Nagashima et al. |
| 7,215,473 | B2 | 5/2007 | Fleming |

(56) References Cited

U.S. PATENT DOCUMENTS

| | | |
|---|---|---|
| 7,236,296 B2 | 6/2007 | Liu et al. |
| 7,315,125 B2 | 1/2008 | Kass |
| 7,470,999 B2 | 12/2008 | Saito et al. |
| 7,569,653 B2 | 8/2009 | Landon |
| 7,619,042 B2 | 11/2009 | Poe et al. |
| 7,845,346 B2 | 12/2010 | Langford et al. |
| 7,871,554 B2 | 1/2011 | Oishi et al. |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,273,801 B2 | 9/2012 | Baikerikar et al. |
| 8,277,945 B2 | 10/2012 | Anderson et al. |
| 8,302,428 B2 | 11/2012 | Borrelli et al. |
| 2002/0016438 A1 | 2/2002 | Sugo et al. |
| 2002/0037943 A1 | 3/2002 | Madsen |
| 2002/0069616 A1 | 6/2002 | Odell et al. |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0072932 A1 | 4/2003 | Gandon |
| 2004/0048997 A1 | 3/2004 | Sugo |
| 2004/0096588 A1 | 5/2004 | Brandt |
| 2004/0199138 A1 | 10/2004 | McBay et al. |
| 2005/0048297 A1 | 3/2005 | Fukuda et al. |
| 2005/0061033 A1 | 3/2005 | Petrany et al. |
| 2005/0170722 A1 | 8/2005 | Keese |
| 2005/0199571 A1 | 9/2005 | Geisler et al. |
| 2006/0068982 A1 | 3/2006 | Fechner et al. |
| 2006/0099360 A1 | 5/2006 | Farha |
| 2006/0233675 A1 | 10/2006 | Stein |
| 2006/0267250 A1 | 11/2006 | Gerretz et al. |
| 2007/0082135 A1 | 4/2007 | Lee |
| 2007/0116907 A1 | 5/2007 | Landon et al. |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0289492 A1 | 12/2007 | Wynne et al. |
| 2007/0293388 A1 | 12/2007 | Zuyev et al. |
| 2008/0008838 A1 | 1/2008 | Arpac et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0121621 A1 | 5/2008 | Stockum et al. |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2009/0048537 A1 | 2/2009 | Lydon et al. |
| 2009/0092759 A1 | 4/2009 | Chen et al. |
| 2009/0104387 A1 | 4/2009 | Postupack et al. |
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0239759 A1 | 9/2009 | Balch |
| 2009/0247699 A1 | 10/2009 | Buehler et al. |
| 2009/0269597 A1 | 10/2009 | Bito et al. |
| 2009/0275462 A1 | 11/2009 | Murata |
| 2009/0286058 A1 | 11/2009 | Shibata et al. |
| 2009/0297857 A1 | 12/2009 | Pascal et al. |
| 2009/0325776 A1 | 12/2009 | Murata |
| 2010/0009154 A1 | 1/2010 | Allan et al. |
| 2010/0044268 A1 | 2/2010 | Haines et al. |
| 2010/0047521 A1 | 2/2010 | Amin et al. |
| 2010/0056666 A1 | 3/2010 | Poe et al. |
| 2010/0062188 A1 | 3/2010 | Miyamoto et al. |
| 2010/0063244 A1 | 3/2010 | Poe et al. |
| 2010/0087307 A1 | 4/2010 | Murata et al. |
| 2010/0101628 A1 | 4/2010 | Poe et al. |
| 2010/0246016 A1 | 9/2010 | Carlson et al. |
| 2010/0264645 A1 | 10/2010 | Jones et al. |
| 2010/0273019 A1 | 10/2010 | Kitaike et al. |
| 2010/0297393 A1 | 11/2010 | Wu |
| 2010/0317506 A1 | 12/2010 | Fechner et al. |
| 2011/0014475 A1 | 1/2011 | Murata |
| 2011/0045219 A1 | 2/2011 | Stewart et al. |
| 2011/0062619 A1 | 3/2011 | Laine et al. |
| 2011/0065576 A1 | 3/2011 | Campbell et al. |
| 2011/0091732 A1 | 4/2011 | Lu et al. |
| 2011/0098172 A1 | 4/2011 | Brix |
| 2011/0159318 A1 | 6/2011 | Endo et al. |
| 2011/0165393 A1* | 7/2011 | Bayne .................. C03C 21/002 428/220 |
| 2011/0177252 A1 | 7/2011 | Kanagasabapathy et al. |
| 2011/0177987 A1 | 7/2011 | Lenting et al. |
| 2011/0186464 A1 | 8/2011 | Carta et al. |
| 2011/0189486 A1 | 8/2011 | Wendell, Jr. |
| 2011/0200804 A1 | 8/2011 | Tomamoto et al. |
| 2011/0226658 A1 | 9/2011 | Tata-Venkata et al. |
| 2011/0272322 A1 | 11/2011 | Yamagata et al. |
| 2011/0274916 A1 | 11/2011 | Murata |
| 2011/0313363 A1 | 12/2011 | D'Souza et al. |
| 2012/0016076 A1 | 1/2012 | Kim et al. |
| 2012/0052293 A1 | 3/2012 | Poe et al. |
| 2012/0052302 A1* | 3/2012 | Matusick ................ C03C 17/32 216/97 |
| 2012/0097159 A1 | 4/2012 | Iyer et al. |
| 2012/0107174 A1 | 5/2012 | Zambaux |
| 2012/0142829 A1 | 6/2012 | Ichinose |
| 2012/0148770 A1 | 6/2012 | Rong et al. |
| 2012/0172519 A1 | 7/2012 | Dörr et al. |
| 2012/0199203 A1 | 8/2012 | Nishizawa et al. |
| 2012/0282449 A1 | 11/2012 | Gross |
| 2013/0011650 A1 | 1/2013 | Akiba et al. |
| 2013/0071078 A1 | 3/2013 | Bennett et al. |
| 2013/0095261 A1 | 4/2013 | Ahn et al. |
| 2013/0101596 A1* | 4/2013 | DeMartino .............. C03C 4/20 428/34.4 |
| 2013/0102454 A1* | 4/2013 | Danielson ................ C03C 4/18 501/72 |
| 2013/0109116 A1* | 5/2013 | Cavuoti .................. H01L 33/58 438/27 |
| 2013/0122306 A1 | 5/2013 | Bookbinder et al. |
| 2013/0127202 A1 | 5/2013 | Hart |
| 2013/0133366 A1 | 5/2013 | Glaesemann et al. |
| 2013/0171456 A1 | 7/2013 | Fadeev et al. |
| 2013/0216742 A1 | 8/2013 | DeMartino et al. |
| 2013/0224407 A1* | 8/2013 | Fadeev ................... C03C 17/42 428/34.7 |
| 2013/0287755 A1 | 10/2013 | Greene et al. |
| 2013/0299380 A1 | 11/2013 | Zambaux et al. |
| 2013/0327740 A1 | 12/2013 | Adib et al. |
| 2014/0031499 A1 | 1/2014 | Cho et al. |
| 2014/0034544 A1 | 2/2014 | Chang et al. |
| 2014/0151370 A1 | 6/2014 | Chang et al. |
| 2015/0274583 A1 | 10/2015 | An et al. |

FOREIGN PATENT DOCUMENTS

| | | |
|---|---|---|
| CN | 2483332 Y | 3/2002 |
| CN | 1402066 A | 3/2003 |
| CN | 1648009 A | 8/2005 |
| CN | 1963650 A | 5/2007 |
| CN | 101479355 A | 7/2009 |
| CN | 201390409 Y | 1/2010 |
| CN | 201404453 Y | 2/2010 |
| CN | 101717189 A | 6/2010 |
| CN | 201694531 U | 1/2011 |
| CN | 102066462 A | 5/2011 |
| CN | 202006114 U | 10/2011 |
| CN | 104508008 A | 4/2015 |
| DE | 4128634 A1 | 3/1993 |
| DE | 4130414 A1 | 4/1993 |
| DE | 29702816 U1 | 4/1997 |

(56) References Cited

FOREIGN PATENT DOCUMENTS

| | | |
|---|---|---|
| DE | 19806390 A1 | 8/1999 |
| DE | 102011085267 A1 | 5/2013 |
| EP | 0176062 A2 | 4/1986 |
| EP | 0330456 A1 | 8/1989 |
| EP | 0515801 A1 | 12/1992 |
| EP | 1464631 A2 | 6/2004 |
| EP | 2031124 A1 | 3/2009 |
| EP | 0524802 B2 | 10/2009 |
| EP | 2540682 A1 | 1/2013 |
| EP | 2762461 A1 | 8/2014 |
| FR | 93015 E | 1/1969 |
| FR | 2033431 A5 | 12/1970 |
| FR | 2515633 A1 | 5/1983 |
| GB | 702292 A | 1/1954 |
| GB | 720778 A | 12/1954 |
| GB | 966731 A | 8/1964 |
| GB | 1267855 A | 3/1972 |
| GB | 1529386 A | 10/1978 |
| IN | 231117 B | 3/2009 |
| JP | S54054124 A | 4/1979 |
| JP | S5532722 A | 3/1980 |
| JP | S5590439 A | 7/1980 |
| JP | 56155044 A | 12/1981 |
| JP | S57123223 A | 7/1982 |
| JP | 60254022 A | 12/1985 |
| JP | 62047623 A | 3/1987 |
| JP | S6373333 U | 5/1988 |
| JP | 1279058 A | 11/1989 |
| JP | 7223845 A | 8/1995 |
| JP | H0826754 A | 1/1996 |
| JP | H09241033 A | 9/1997 |
| JP | 11171593 A | 6/1999 |
| JP | H11229629 A | 8/1999 |
| JP | 11314931 A | 11/1999 |
| JP | 2004315285 A | 11/2004 |
| JP | 2005343742 A | 12/2005 |
| JP | 2006104052 A | 4/2006 |
| JP | 2007204728 A | 8/2007 |
| JP | 2009175600 A | 8/2009 |
| JP | 2009204780 A | 9/2009 |
| JP | 2010071042 A | 4/2010 |
| JP | 4483331 B2 | 6/2010 |
| JP | 2010185185 A | 8/2010 |
| JP | 2011057547 A | 3/2011 |
| JP | 2011236100 A | 11/2011 |
| JP | 2013003310 A | 1/2013 |
| JP | 2013516387 A | 5/2013 |
| JP | 2014101659 A | 11/2016 |
| RU | 2127711 C1 | 3/1999 |
| WO | 2008134315 A2 | 11/2008 |
| WO | 2008134315 A3 | 12/2008 |
| WO | 2011001501 A1 | 1/2011 |
| WO | 2011121811 A1 | 10/2011 |
| WO | 2012151459 A1 | 11/2012 |
| WO | 2013130721 A1 | 9/2013 |

OTHER PUBLICATIONS

Non-Final Office Action dated Mar. 4, 2021, for U.S. Appl. No. 16/996,758, filed Aug. 18, 2020. pp. 1-12.
Iacocca, et al., "Corrosive attack of glass by a pharmaceutical compound," Journal of Materials Science, 42:801-811, Springer Science+Business Media, LLC (2007), DOI: 10.1007/s10853-006-0156-y.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Schwarzenbach, et al., "Topological Structure and Chemical Composition of Inner Surfaces of Borosilicate Vials," PDA Journal of Pharmaceutical Science and Technology, May / Jun. 2004, vol. 58, No. 3, 169-175.
International Search Report and Written Opinion dated Nov. 20, 2015 for PCT/US2015/048592 filed Sep. 4, 2015. pp. 1-11.

Chao-Ching Chang et al., Synthesis and Optical Properties of Soluble Polyimide/Titania Hybrid Thin Films, Macromol. Mater. Eng., (2006), Issue 12, vol. 291, pp. 1521-1528.
Yang-Yen Yu, et al., High transparent polyimide/titania multi-layer anti-reflective hybrid films, Thin Solid Films 519 (2011) 4731-4736.
Qiu, et al., "Morphology and size control of inorganic particles in polyimide hybrids by using $SiO_2$—$TiO_2$ mixed oxide", Polymer 44 (2003) 5821-5826.
Extended European Search Report dated Jan. 8, 2016 for EP Patent Application No. 15290254.0. pp. 1-6.
Extended European Search Report dated Sep. 8, 2021, for EP Patent Application No. 21187669.3. pp. 1-11.
Shallenberger J. R. et al: Adsorption of polyamides and polyamide-silane mixtures at glass surfaces, Surface and Interface Analysis, vol. 35, No. 8, Aug. 1, 2003 (Aug. 1, 2003), pp. 667-672, XP055081787, ISSN: 0142-2421, DOI: 10.1002/sia.1589.
Wohl C. J. et al: Modification of the surface properties of polyimide films using polyhedral oligomeric silsesquioxane deposition and oxygen plasma exposure, Applied Surface Science, Elsevier, Amsterdam, NL, vol. 255, No. 18, Jun. 30, 2009 (Jun. 30, 2009), pp. 8135-8144, XP026221236, ISSN: 0169-4332, DOI: 10.1016/J.APSUSC.2009.05.030.
Singapore Written Opinion and Search Report dated Jan. 20, 2021, for SG Patent Application No. 10201704148S. pp. 1-10.
Singapore Written Opinion and Search Report dated Jan. 25, 2021, for SG Patent Application No. 10201705439Y. pp. 1-10.
English Translation of Chinese 1st Office Action & Search Report dated Jan. 12, 2021, for CN Patent Application No. 201811406323.5. pp. 1-11.
International Search Report & Written Opinion dated Oct. 28, 2013, relating to PCT/US2013/028187 filed Feb. 28, 2013. pp. 1-13.
International Search Report & Written Opinion dated Oct. 28, 2013 relating to PCT/US2013/048589 filed Jun. 28, 2013. pp. 1-15.
International Search Report & Written Opinion dated Jan. 16, 2014 relating to PCT/US2013/066370 filed Oct. 23, 2013. pp. 1-12.
Huang, et al., "Cubic silsesquioxane-polyimide nanocomposites with improved thermomechanical and dielectric properties", Acta Materialia, Elsevier, vol. 53, No. 8, pp. 2395-2404, May 1, 2005; ISSN: 1359-6454.
Final Office Action dated Jan. 28, 2014 relating to U.S. Appl. No. 13/780,740, filed Feb. 28, 2013. pp. 1-37.
Non-Final Office Action dated Mar. 10, 2014 relating to U.S. Appl. No. 14/052,048, filed Oct. 11, 2013. pp. 1-11.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.
International Search Report & Written Opinion dated Feb. 26, 2014 for International Patent Application No. PCT/US2013/071437 filed Nov. 22, 2013. pp. 1-12.
International Search Report and Written Opinion dated Oct. 2, 2013, relating to International Patent Application No. PCT/US2013/044686 filed Jun. 7, 2013. pp. 1-17.
Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.
U.S. Department of Health & Human Services, "Advisory to Drug Manufactures: Formation of Glass Lamellae in Certain Injectable Drugs" [online] U.S. Food & Drug Administration, Mar. 25, 2011, retrieved from the internet: <URL: http://www.fda.gov/Drugs/DrugSafety/ucm248490.htm>.
Non-Final Office Action dated Jul. 30, 2013 relating to U.S. Appl. No. 13/780,740, filed Feb. 28, 2013. pp. 1-34.
De Rosa, et al., "Scratch Resistant Polyimide Coatings for Aluminosilicate Glass Surfaces", The Journal of Adhesion, 78: 113-127, Taylor & Francis (2002), ISSN: 0021-8464.
Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.

(56) References Cited

OTHER PUBLICATIONS

Walther, et al., "Pharmaceutical Vials with Extremely High Chemical Inertness" [online], PDA Journal of Pharmaceutical Science and Technology, May / Jun. 2002, vol. 56, No. 3, 124-129 (abstract); retrieved from the Internet: <URL: http://journal.pda.org/content/56/3/124.abstract>.
Wagner, C., "PDA/FDA Glass Quality Conference: an alternative glass packing solution to reduce delamination risks," [PowerPoint Presentation] PDA/FDA Glass Quality Conference, Washington, D.C., Jun. 4-5, 2012.
Non-Final Office Action dated Dec. 12, 2019, for U.S. Appl. No. 15/508,815, filed Mar. 3, 2017. pp. 1-9.
DuPont Teflon PFA TE-7224 Aqueous Fluoropolymers made with Echelon Dispersion Technology [online]. Dupont, 2006. Retrieved from the Internet: <URL: http://www2.dupont.com/Teflon_Industrial/en_US/assets/downloads/k15758.pdf>.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, April 19-24, 2008.
"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.
Benitez, et al., "SiOx—SiNx functional coatings by PECVD of organosilicon monomers other than silane", Annual Technical Conference Proceedings—Society of Vacuum Coaters (2002), 45th, 280-285; ISSN: 0731-1699.
Cho, et al. "Adhesion behavior of PDMS-containing polyimide to glass", Journal of Adhesion Science and Technology 12:3, pp. 253-269, Taylor & Francis (1998), DOI: 10.1163/156856109X00867.
Dow Corning, "A Guide to Silane Solutions: Fiberglass and Composites", Silicones Simplified [online]. Dow Corning Corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.
Ennis, et al., "Glass Vials for Small Volume Parenterals: Influence of drug and manufacturing process on glass delamination," Pharmaceutical Development and Technology, 6(3): p. 393-405, (2001).
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gelest, Inc., MSDS, Material Safety Data Sheet, Aminopropylsilsesquioxane Oligomer, 22-25%—WSA-9911 [online]. Gelest, Inc. Morrisville, PA, 2008. Retrieved from the Internet: <URL: http://shop.gelest.com/Product.aspx?catnum=WSA-9911&Index=0&TotalCount=1>.
Guadagnino, et al., "Delamination Propensity of Pharmaceutical Glass Containers by Accelerated Testing with Different Extraction Media," PDA Journal of Pharmaceutical Science and Technology, Mar. / Apr. 2012, vol. 66, No. 2,116-125. DOI: 10.5731/pdajpst.2012.00853.
Jiang, et al., "Novel Mechanism of Glass Delamination in Type 1A Borosilicate Vials Containing Frozen Protein Formulations", PDA Journal of Pharmaceutical Science and Technology, Jul. / Aug. 2013, vol. 67, No. 4, 323-335.
Jin, et al. "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.

Jin, et al., "Preparation and investigation of the tribological behavior of poly(phthalazinone ether ketone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.
Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.
Rupertus, V., "PDA Europe Thanks Universe of Pre-Filled Syringes: Two ways to minimize the delamination risk of glass containers," P&M—EU; PDA Letter, p. 42-23, Jan. 2012.
Schmid, et al., "Recommendations on Delamination Risk Mitigation & Prediction for Type I Pharmaceutical Containers Made of Tubing Glass", Nuova Ompi: Glass Division, p. 40-42, Frederick Furness Publishing (2012).
Schmid, et al., "Glass Delamination: Facts—Prevention—Recommendations", Stevanato Group Market Update, News Issue 5, May 2011, p. 1-4.
Schott North America, Inc., "Schott Type 1 plus: SiO2 coating resists delamination" [online], Schott North America, Inc., retrieved from the internet: <URL: http://www.us.schott.com/pharmaceutical_packaging/english/download/flyer_type_i_plus_us.pdf>.
Sloey, et al., "Determining the Delamination Propensity of Pharmaceutical Glass Vials Using a Direct Stress Method," PDA Journal of Pharmaceutical Science and Technology, Jan. / Feb. 2013, vol. 67, No. 1, 35-42. DOI: 10.5731/pdajpst.2013.00900.
Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.
Japanese Office Action dated Jun. 15, 2022, pertaining to JP Patent Application No. 2017-512381, 9 pgs.
Mexican Office Action dated May 26, 2022, pertaining to MX Patent Application No. MX/a/2017/002898, 8 pgs.
Taiwan Office Action dated Apr. 18, 2022, pertaining to TW Patent Application No. 110124379, 5 pgs.
European Extended Search Report dated May 10, 2022, pertaining to EP Patent Application No. 22153571.9, 6 pgs.
Canadian Exam Report received Jan. 18, 2022, pertaining to Canadian Appl. No. 3061514, 3 pgs.
Final Office Action, pertaining to U.S. Appl. No. 15/857,557, filed Dec. 28, 2017, 16 pgs.
Final Office Action, pertaining to U.S. Appl. No. 17/213,859, filed Mar. 26, 2021, 32 pgs.
Extended European Search Report, pertaining to European Appl. No. 21191737.2, 12 pgs.
Japanese Office Action dated Mar. 7, 2022, pertaining to JP Patent Application No. 2021-039178.
English Translation of Japanese 2nd Office Action dated Apr. 30, 2020 for JP 2017-512381. pp. 1-5.
English Translation of Russian Decision to Grant & Search Report dated Apr. 5, 2019, for RU Patent Application No. 2017110800. pp. 1-20.
English Translation of Chinese 1st Office Action & Search Report dated Apr. 23, 2019, for CN Patent Application No. 201580058550.1. pp. 1-18.
Japanese 1st Office Action dated Jun. 30, 2021, for JP Patent Application No. 2020-82562. pp. 1-12.
Japanese 1st Office Action dated Jul. 28, 2021, for JP Patent Application No. 2020-110294. pp. 1-6.
Non-Final Office Action dated Jun. 8, 2021, for U.S. Appl. No. 15/280,101, filed Sep. 29, 2016. pp. 1-22.
Non-Final Office Action dated Jul. 15, 2021, for U.S. Appl. No. 16/355,797, filed Mar. 17, 2019. pp. 1-13.
Japanese Office Action dated Mar. 30, 2023, pertaining to JP Patent Application No. 2019-121650, 4 pgs.

* cited by examiner

GLASS ARTICLES AND METHODS FOR IMPROVING THE RELIABILITY OF GLASS ARTICLES

CROSS REFERENCE TO RELATED APPLICATIONS

The present application is a divisional application of U.S. patent application Ser. No. 15/508,815 filed Mar. 3, 2017 and entitled "Glass Articles and Methods for Improving the Reliability of Glass Articles", which is a 371 National Stage Entry of PCT/US2015/048592 filed Sep. 4, 2015 and entitled "Glass Articles and Methods for Improving the Reliability of Glass Articles", which claims priority to U.S. Provisional Application No. 62/046,208 filed Sep. 5, 2014 and entitled "Methods For Improving The Reliability Of Glass Articles," each of which is incorporated by reference herein in their entireties.

BACKGROUND

Field

The present specification generally relates to glass articles and, more particularly, to methods for mitigating mechanical failure and improving the reliability of glass articles due to the presence of flaws.

Technical Background

Glass articles are increasingly employed in a wide variety of consumer and commercial products including smart phones, tablets, lap-top computers, automated teller machines, food and beverage packages, and the like. While various techniques are available to improve the strength of glass articles, there is an ever present risk that the glass articles may fail due to the presence of flaws in the material. As such, there is an emphasis on reducing the likelihood of failure of these glass articles.

The strength of a glass article is determined by the damage history from melt surface to use and the applied stress experienced during use, including the magnitude, location, and duration of the stress. This leads to a strength distribution for any given population of manufactured glass articles as no two glass articles have the same damage history. As a result, the probabilistic strength of a glass article can be difficult to predict, particularly considering this strength distribution variability.

One method of decreasing strength distribution variability includes tempering the as-manufactured glass article to ensure all surface flaws are within residual compressive stress zone imparted to the glass article. Means of tempering include thermal quenching of the surface or chemically exchanging network modifier ions (i.e., ion exchange strengthening). These processes are limited in effectively reducing strength distribution variability by the depth of the residual compressive stress that they are able to impart to the glass article. In particular, the depth of the residual compressive stress depends on the thickness of glass used in the article as well as the composition of the glass. If the depth of the compressive stress does not exceed the deepest flaw in the glass article, there is little to no benefit of the residual compressive stress in load bearing situations. Therefore, neither of these tempering approaches can be used to effectively reduce strength distribution variability for glass articles with flaws that extend beyond the depth of residual compressive stress.

Coatings, both organic and inorganic, have been shown to decrease the severity of damage introduction in glass articles throughout their lifetime, thereby reducing the strength distribution variability during the lifetime of the glass article. But, the effective use of coatings first requires that the glass articles be produced according to a manufacturing process which yields glass articles with an adequate strength distribution for their intended use. The addition of the coating only maintains that strength distribution throughout the lifetime of the product—it does not reduce the strength distribution variability. That is, if the manufacturing process does not produce an adequate strength distribution, then the coating is not going to decrease the strength distribution variability.

Accordingly a need exists for alternative methods for decreasing the strength distribution variability in glass articles, thereby mitigating mechanical failure of the glass article and improving reliability.

SUMMARY

According to one embodiment, a glass article may include a glass body having a first surface and a second surface opposite the first surface. The first surface and the second surface each have a radius of curvature. The first surface of the glass body comprises a flaw population extending from the first surface into a thickness of the glass body with a maximum initial flaw depth Ai. The first surface of the glass body may be etched to a depth less than or equal to about 25% of the maximum initial flaw depth Ai of the flaw population present in the first surface. When the glass article is under uniaxial compressive loading, at least a portion of the first surface is in tension and a uniaxial compressive strength of the glass article is greater than or equal to 90% of a uniaxial compressive strength of a flaw-free glass article.

According to another embodiment, a method for improving the reliability of glass articles may include providing a glass article having a first surface, a second surface opposite the first surface, an initial thickness $T_i$ extending from the first surface to the second surface, and a flaw population with a maximum initial flaw depth $A_i$ extending from the first surface into the initial thickness $T_i$. Glass material is selectively removed from the first surface of the glass article and adjacent to each flaw in the flaw population at a uniform rate by chemically processing at least the first surface of the glass article at a temperature and for a time such that, after chemically processing: flaws having the maximum initial flaw depth $A_i$ remain in the glass article and have a post-processing stress concentration factor $Kt_{pp}$ at a tip of the flaw which is less than an initial stress concentration factor $Kt_i$ at the tip of the flaw prior to chemical processing; the flaw population has a maximum post-processing flaw depth $A_{pp}$ which is substantially equal to $A_i$; a post-processing thickness $T_{pp}$ of the glass article is less than the initial thickness $T_i$; and $|T_{pp}-T_i|$ is substantially equal to $|A_{pp}-A_i|$.

Additional features and advantages of the methods for mitigating mechanical failure in glass articles and improving reliability described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an over-view or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
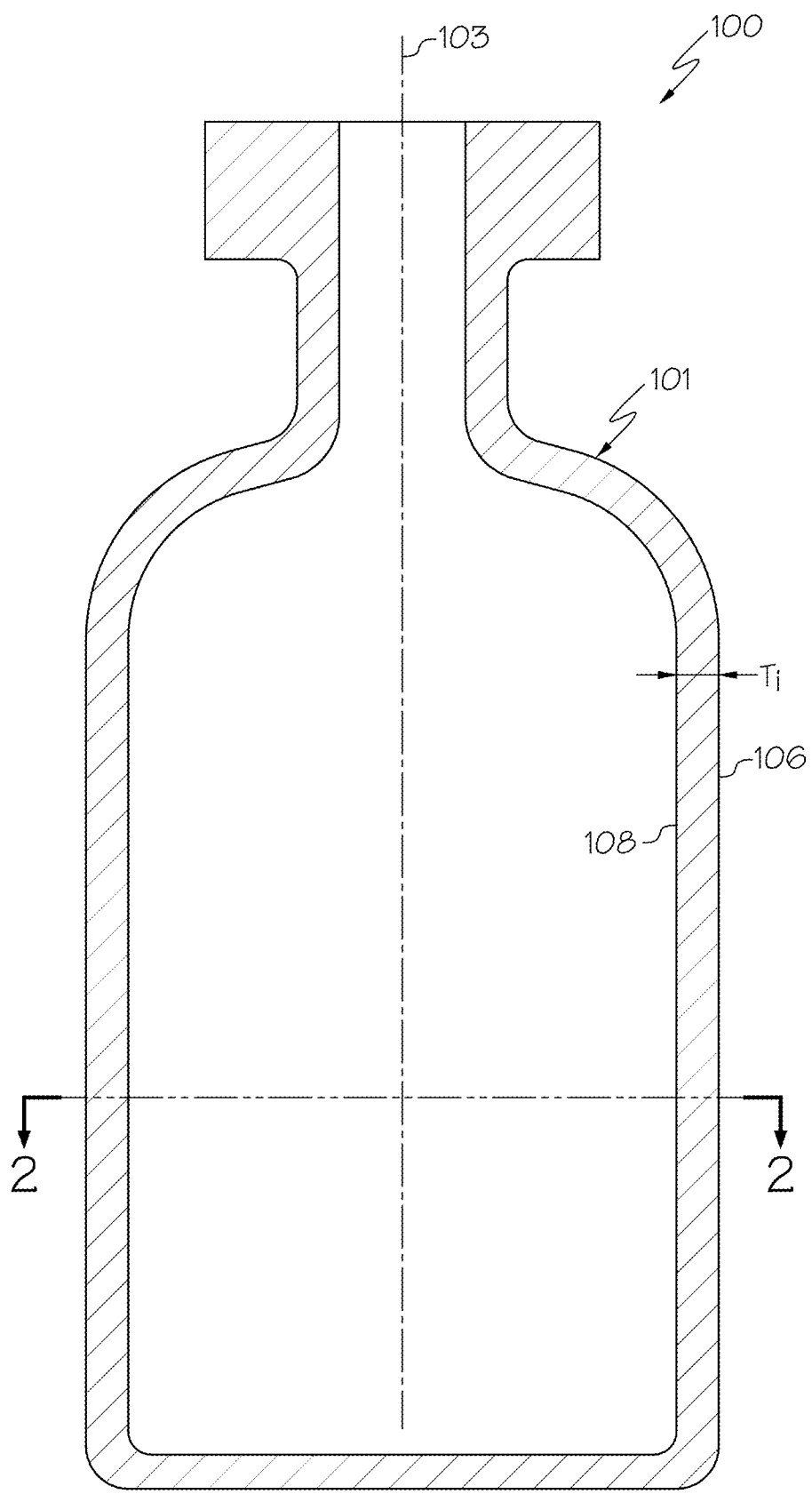
FIG. 1 schematically depicts a cross section of a glass article according to one or more embodiments described herein.

Reference will now be made in detail to embodiments of glass articles and methods for mitigating the mechanical failure of glass articles, examples of which are illustrated in the accompanying drawings. Whenever possible, the same reference numerals will be used throughout the drawings to refer to the same or like parts. According to one embodiment, a glass article may include a glass body having a first surface and a second surface opposite the first surface. The first surface and the second surface each have a radius of curvature. The first surface of the glass body comprises a flaw population extending from the first surface into a thickness of the glass body with a maximum initial flaw depth Ai. The first surface of the glass body may be etched to a depth less than or equal to about 25% of the maximum initial flaw depth Ai of the flaw population present in the first surface. When the glass article is under uniaxial compressive loading, at least a portion of the first surface is in tension and a uniaxial compressive strength of the glass article is greater than or equal to 90% of a uniaxial compressive strength of a flaw-free glass article. Various embodiments of glass articles and methods for mitigating mechanical failure of glass articles and improving the reliability of glass articles will be described herein with specific reference to the appended drawings.

Conventionally, the predominant method for reducing the strength distribution variability of a population of glass articles has been to over engineer the glass articles to account for the "worst case" flaw scenario. Specifically, the maximum size of a flaw population introduced in a glass article during manufacturing or subsequent processing may be statistically determined by studying a statistically significant population of glass articles which have undergone the same manufacturing and/or processing conditions.

Once the maximum size of a flaw in the glass article has been determined, a remediation treatment, such as an etching treatment or the like, may be developed to remove glass material from the surface of the glass article to a depth greater than the maximum size of a flaw in the glass article, effectively removing the entire flaw population from the glass article. In many cases, the design of the glass article will be revised to account for this loss of material by adding additional thickness to the glass such that the finished product is within design specifications in terms of thickness following any treatment to remove the flaw population.

While such a technique is effective for reducing the strength distribution variability in a population of glass articles, it ultimately adds significantly to the cost of the glass article by requiring the addition of glass material in the design to account for material lost during any remediation treatments.

The methods described herein reduce the strength distribution variability in a population of glass articles without the removal of glass material from the surface of the glass article to a depth greater than or equal to the maximum size of a flaw in the glass article. That is, the methods described herein do not completely remove the flaw population from the surface of the glass article.

Figure 2:
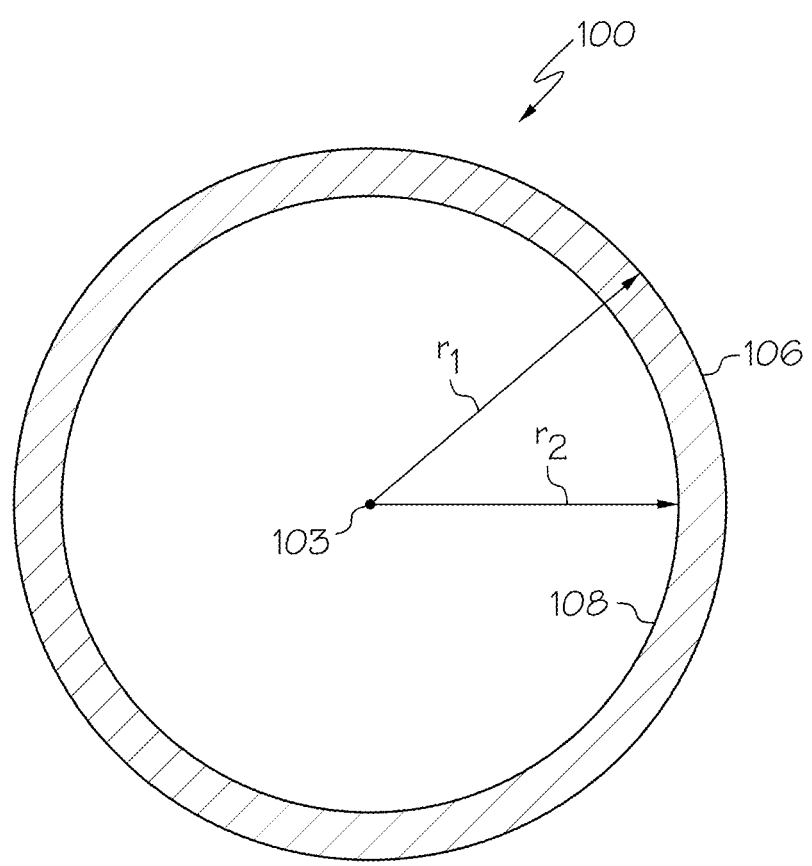
FIG. 2 schematically depicts a cross section of the glass article of FIG. 1.

Referring now to FIGS. 1 and 2, one embodiment of a glass article 100 is schematically depicted. The glass article 100 includes a glass body 101 having a first surface 106, a second surface 108, and a thickness $T_t$ extending between the first surface 106 and the second surface 108. In embodiments, the glass article 100 may have a curved geometry, such as when the glass article 100 is a rod or cylinder. For example, in embodiments, the glass article 100 may have curved geometry with a substantially continuous sidewall at least partially enclosing an interior volume, such as when the glass article 100 is a glass container as depicted in FIG. 1. The glass container may be used for storing food or beverages, or even as a pharmaceutical package. For example, in some embodiments, the glass container may be a vial, Vacutainer®, cartridge, syringe, ampoule, bottle, flask, phial, tube, beaker or the like, including both round-form glass containers and non-round-form glass containers. In these embodiments, the first surface 106 of the glass article 100 may be an exterior surface of the glass container and the second surface 108 may be an interior surface of the glass container. Further, the first surface 106 of the glass article 100 may have a first radius of curvature $r_1$, as measured from the long axis 103 of the glass article 100, and the second surface 108 of the glass article 100 may have a second radius of curvature $r_2$, also measured from the long axis 103 of the glass article 100. The second radius of curvature $r_2$ may be the same as the first radius of curvature $r_1$ or, alternatively, the second radius of curvature $r_2$ may be different than the first radius of curvature $r_1$.

In embodiments where the glass article 100 is a glass container as depicted in FIGS. 1 and 2, the glass article 100 has a uniaxial compressive strength. In embodiments, the uniaxial compressive strength may be measured using, for example, the horizontal compression test apparatus described at paragraph [00149] of pending U.S. patent application Ser. No. 13/780,740, filed Feb. 28, 2013 and entitled "Glass Articles With Low-Friction Coatings." Specifically referring to FIG. 3 of the present specification, the uniaxial compressive strength of the glass article 100 may be measured by placing the glass article 100 between two opposed platens 202, 204 of the apparatus such that the long axis 103 of the glass article is generally orthogonal to the applied compressive load (schematically represented by arrows 300, 302) applied to the glass article 100 by the platens 202, 204. Thereafter, at least one of the platens 202, 204 is advanced toward the other to apply the compressive load to the glass article 100. When the glass article 100 is under compression, at least a portion of the first surface 106 of the glass body 101 is in tension. For example, when the glass article 100 is under compression, at least the region 107 of the first surface 106 of the glass article 100 is under tension. The compressive load applied to the glass article 100 by the platens 202, 204 is further increased until the glass article 100 fails through fracture. The compressive load applied at failure is considered the uniaxial compressive strength of the glass article. In embodiments where the compressive load is applied generally orthogonal to the long axis of the glass article, the uniaxial compressive strength may also be referred to as the horizontal compression strength.

Figure 3:
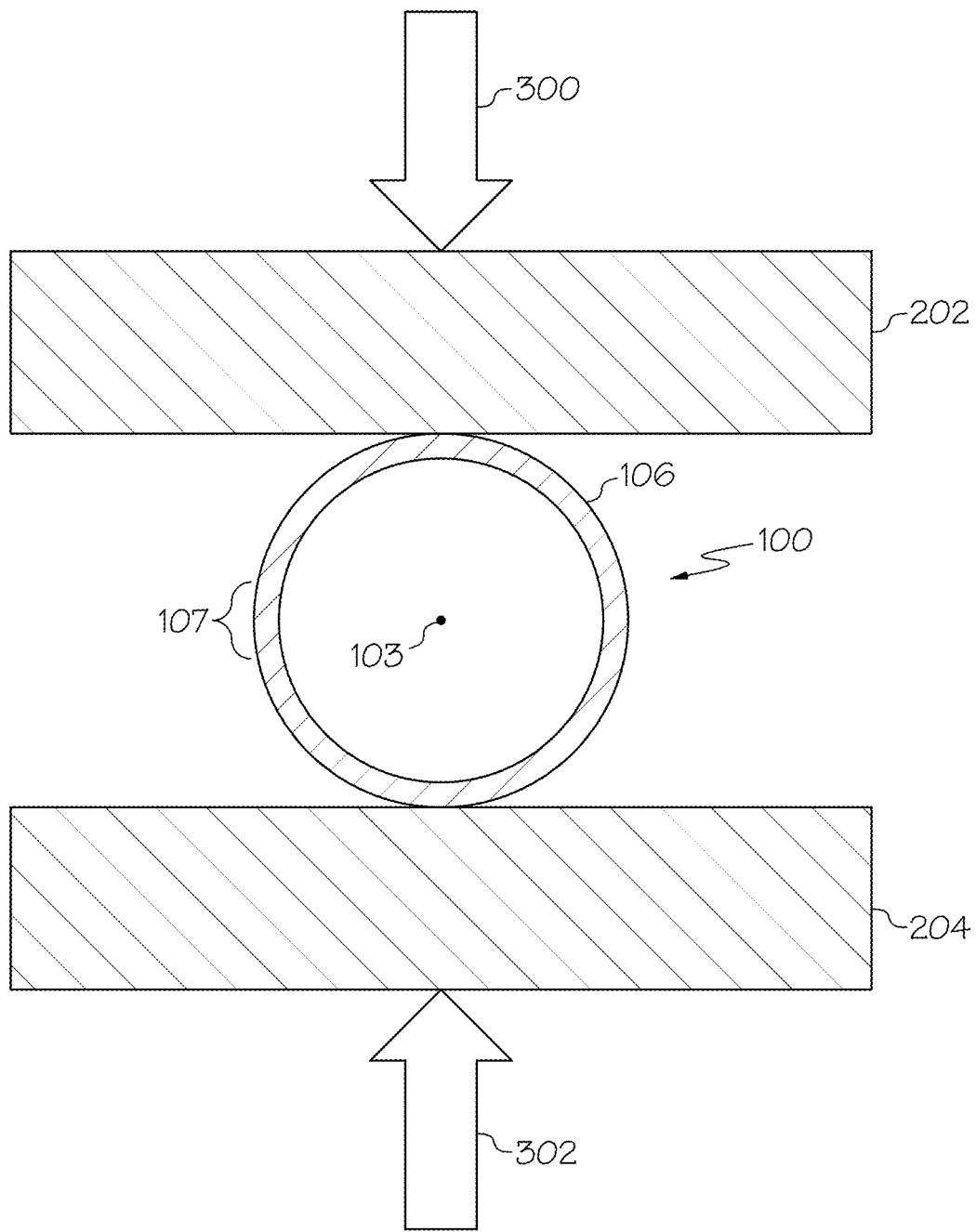
FIG. 3 schematically depicts the glass article of FIG. 1 positioned in an apparatus for determining the uniaxial compressive strength of the glass article.

While FIG. 3 depicts the compressive load as being applied in a direction generally orthogonal to the long axis 103 of the glass article 100 such that a portion of the first surface 106 of the glass article 100 is in tension, it should be understood that other methods for determining the uniaxial compressive strength of the glass article 100 are contemplated and possible. For example, in some embodiments (not shown), the uniaxial compressive strength of the glass article 100 may be determined by orienting the glass article 100 between the platens 202, 204 such that the long axis 103 of the glass article 100 is parallel to the applied compressive load. In this embodiment, at least a portion of the first surface 106 of the glass article 100 is under tension during application of the compressive load, such as when the wall of the glass article buckles radially outward. In this embodiment, a portion of the first surface 106 of the glass article 100 around the entire circumference of the glass article 100 is under tension.

In some embodiments, the glass articles described herein are formed from aluminosilicate glass compositions, such as the glass compositions described in U.S. Pat. Nos. 8,980,777, 8,551,898, or U.S. Pat. No. 8,753,994. Alternatively, the glass articles may be formed from borosilicate glass compositions, such as conventional Type 1, Class A or Class B borosilicate glasses according to ASTM E438-92(2011) or even Type II glass compositions according to ASTM E438-92(2011). However, it should be understood that the specific type of glass composition from which the glass articles are formed is not particularly limited and that other suitable glass compositions are contemplated.

Figure 4:
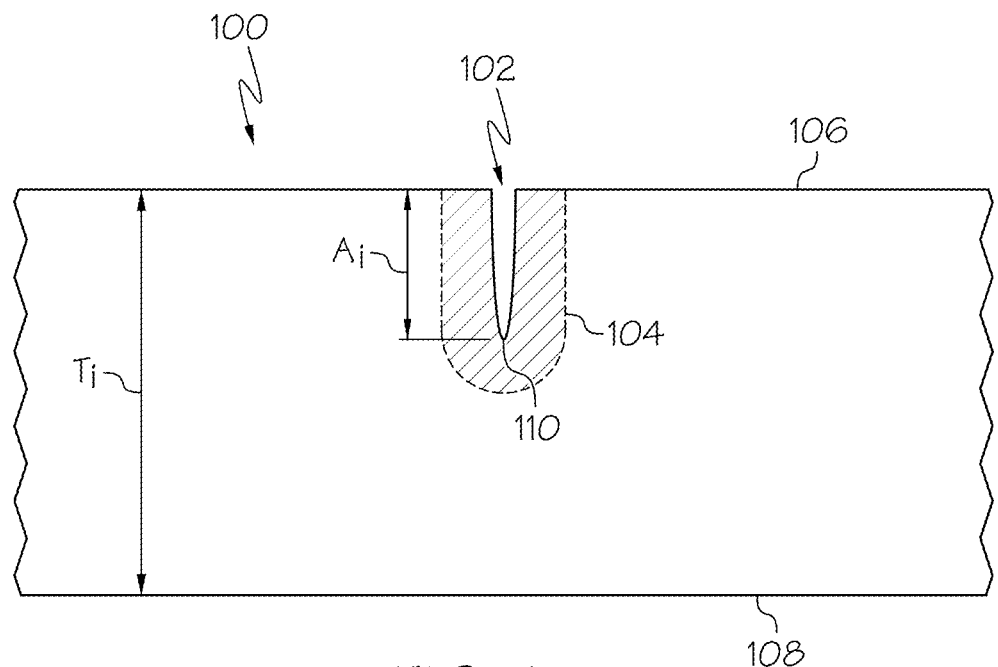
FIG. 4 schematically depicts a portion of a glass article with a flaw prior to chemical processing.
Figure 6A:
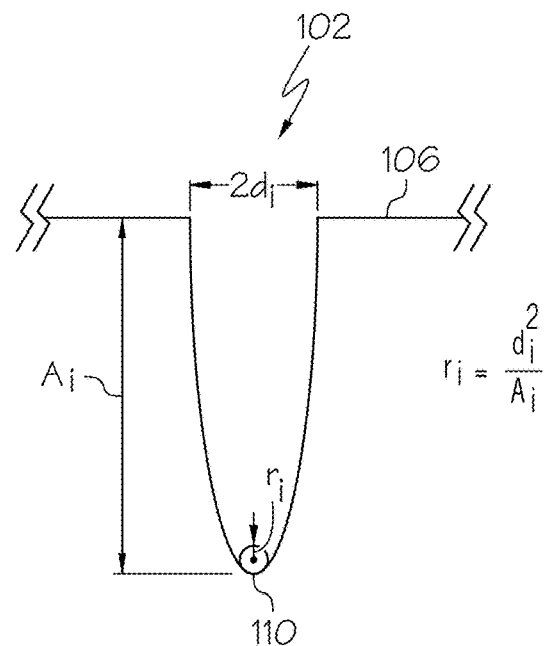
FIG. 6A schematically depicts a close-up view of the flaw of FIG. 1.

Referring now to FIGS. 4 and 6A, in the embodiments described herein, the glass articles 100 include a flaw population in at least the first surface 106 of the glass article 100. In general, the presence of the flaw population decreases the uniaxial compressive strength of the glass article relative to a flaw-free glass article. As used herein, the phrase "flaw-free" glass body or glass article refers to a theoretical glass article or glass body formed from the same material and having the same shape and dimensions as the glass article or glass body being assessed but which is completely free of flaws. The flaw population extends from the first surface 106 into the thickness $T_i$ of the glass article 100 towards the second surface 108. Each flaw 102 in the flaw population has a flaw depth which is less than or equal to the maximum initial flaw depth $A_i$ as measured from the first surface 106 of the glass article to the tip 110 of the flaw 102. In the embodiments described herein, each flaw 102 is described as an elliptical crack. That is, the flaw 102 has the shape of half of an ellipse with a major axis $2A_i$ and a minor axis $2d_i$. Thus, each flaw extends into the thickness $T_i$ of the glass article 100 to a depth that is less than or equal to $A_i$. The initial radius of curvature $r_i$ at the tip 110 of the flaw 102 is a function of the width and depth of the crack such that $r_i = d_i^2/A_i$.

In embodiments, the maximum initial flaw depth $A_i$ for a given population of glass articles exposed to identical manufacturing, processing, and handling conditions (and therefore subject to the same mechanical insults potentially resulting in the introduction of flaws) can be determined by examining a statistically significant subset of the population of glass articles to determine a flaw depth distribution for the entire population. The maximum initial flaw depth $A_i$ can be determined directly from the flaw depth distribution.

Each flaw 102 has an initial stress intensity factor $Kt_i$. The initial stress intensity factor $Kt_i$ is a dimensionless factor which relates to the magnitude of stress in the material surrounding the tip 110 of the flaw and, as such, directly relates to the propensity of the flaw 102 to propagate through the material, ultimately resulting in the failure of the glass article 100. Specifically, larger values of the initial stress intensity factor $Kt_i$ indicate greater tensile stress in the material and a greater propensity for crack propagation, particular when the internal residual tensile stresses are combined with externally applied stresses acting on the glass article. The initial stress intensity factor $Kt_i$ is inversely proportional to the initial radius of curvature $r_i$ at the tip 110 of the flaw 102. That is, the initial stress intensity factor $Kt_i$ is greater for a flaw 102 with a small initial radius of curvature $r_i$ at the tip 110 of the flaw 102 and lower for a flaw 102 with a relatively larger initial radius of curvature $r_i$ at the tip 110 of the flaw 102.

Referring again to FIG. 4, the glass articles 100 further include a crack affected zone 104 which surrounds the flaw 102. The crack affected zone 104 extends into the initial thickness $T_i$ of the material to a depth greater than or equal to the maximum initial flaw depth $A_i$ of the flaw 102. In addition, the crack affected zone 104 has a width greater than the width $2d_i$ of the flaw 102. The glass material within the crack affected zone 104 is compositionally the same as the material in the remainder of the glass article. However, while not wishing to be bound by theory, it is hypothesized that the glass material within the crack affected zone 104 has slightly different physical properties due to the introduction of a flaw 102 into the first surface 106 of the glass article 100. Specifically, it is hypothesized that the introduction of a flaw 102 into the first surface 106 of the glass article 100 leaves the glass material directly adjacent to the flaw 102 in the crack affected zone 104 at a higher energy state by creating stretched and/or broken molecular bonds in the constituent components of the glass network. As a result, it is hypothesized that the material directly adjacent to the flaw 102 in the crack affected zone has a higher energy state and, as a result, is more susceptible to dissolution upon exposure to a chemical treatment, such as an etching solution or the like, than the material in the bulk of the glass article 100 that is not within the crack affected zone 104.

In the embodiments described herein, the strength distribution variability in the glass article 100 due to the presence of the flaw population is reduced or mitigated and the reliability of the glass article 100 is improved by selectively removing material along the depth of each flaw in the population and, specifically, selectively removing material along the maximum initial flaw depth $A_i$ (i.e., selectively removing glass material from the crack affected zone) while minimizing the removal of material from the first surface 106 of the glass article 100. As a result, the tip 110 of the flaw 102 is widened or "blunted" by enlarging the radius of curvature at the tip 110, thereby reducing the initial stress intensity factor $Kt_i$ and the propensity of the flaw 102 to propagate through the thickness of the glass material. However, after, the selective removal of material along the maximum initial flaw depth $A_i$, at least a portion of the flaw population remains in the glass article. More specifically, at least those flaws which have the maximum initial flaw depth $A_i$ are still present in the glass article following removal of the glass material.

In embodiments where the glass article comprises curved surfaces, as described herein, the selective removal of material from along the depth of the flaws in the flaw population increases the uniaxial compressive strength of the glass article relative to a flaw-free glass article. That is, selective removal of material from along the depth of the flaws in the flaw population increases the uniaxial compressive strength such that the uniaxial compressive strength approaches the uniaxial compressive strength of a flaw-free glass article. For example, in embodiments, the selective removal of material from along the depth of the flaws in the flaw population increases the uniaxial compressive strength of the glass article to greater than or equal to 90% of the uniaxial compressive strength of a flaw-free glass article. In some embodiments, the selective removal of material from along the depth of the flaws in the flaw population increases the uniaxial compressive strength of the glass article to greater than or equal to 92% of the uniaxial compressive strength of a flaw-free glass article or even greater than or equal to 95% of the uniaxial compressive strength of a flaw-free glass article. In some other embodiments, the selective removal of material from along the depth of the flaws in the flaw population increases the uniaxial compressive strength of the glass article to greater than or equal to 98% of the uniaxial compressive strength of a flaw-free glass article.

In some embodiments, glass material is selectively removed along the maximum initial flaw depth $A_i$ of the flaw 102 by chemical processing. In embodiments, chemical processing may include contacting the glass article 100 with an etching solution. In embodiments, the glass article may be chemically processed by bringing an etching solution into contact with both the first surface 106 and the second surface 108 of the glass article 100, such as when the glass article is completely immersed in a bath of the etching solution. In some other embodiments, the etching solution is brought into contact with only the first surface 106 of the glass article 100. For example, in embodiments where the glass article 100 is a glass container in which the first surface 106 is an external surface of the glass container and one of the ends of the glass container is closed, such as when the glass container is a glass vial, the glass article may be immersed in a bath of the etching solution such that the etching solution only contacts the external surface of the glass container and not the interior surface (i.e., the second surface 108) of the glass container.

In some embodiments, each flaw 102 in the flaw population may be closed prior to chemical processing. That is, the flaws in the glass container may be the result of elastically derived frictive damage which, following the introduction of the damage, causes the flaws to close such that the fracture faces on either side of the flaw are in contact with one another along the depth of each flaw. In this scenario, when the chemical processing treatment involves contacting the first surface of the glass article with an etching solution, the etching solution may not be able to enter the flaw itself; instead, the selective removal of material from within the crack affected zone 104 due to contact with the etching solution proceeds from the first surface 106 of the glass article to the tip 110 of the flaw 102 (i.e., from the surface of the glass article to the interior of the glass article) without a corresponding removal of glass material to the same depth from the first surface 106 of the glass article in areas outside of the crack affected zone 104. This behavior, which has been observed experimentally, supports the hypothesis that the glass material in the crack affected zone 104 is more susceptible to dissolution than the glass material in the bulk of the glass article outside of the crack affected zone 104.

In embodiments, chemical processing is carried out by contacting at least the first surface of the glass article with an etching solution at a concentration and for a time and at a temperature sufficient to selectively remove the material along the maximum initial flaw depth $A_i$ in the crack affected zone 104 while removing less than or equal to the same amount of material (at least in terms of depth) from the first surface 106 and/or the second surface 108 of the glass article. That is, the etching solution applied to at least the first surface 106, and the conditions under which the etching solution is applied, does not result in the removal of glass material from the first surface 106 of the glass article down to a depth corresponding to the maximum initial flaw depth $A_i$ such that the entire flaw population is removed from the first surface 106 of the glass article; instead, the etching solution applied to at least the first surface 106, and the conditions under which the etching solution is applied, are sufficient to remove the material within the crack affected zone 104 surrounding the flaw with minimal removal of material from either the first surface 106 and the second surface 108 of the glass article. This has the effect of leaving behind at least a portion of the flaw population in the first surface 106 of the glass article 100, albeit with a different morphology, following chemical processing.

In embodiments, at least the first surface of the glass article is etched to a depth less than or equal to about 25% of the maximum initial flaw depth $A_i$ of the flaw population present in the first surface of the of the glass article. For example, in some embodiments, the first surface of the glass article may be etched to a depth less than or equal to about 20% or even less than or equal to about 15% of the maximum initial flaw depth $A_i$ of the flaw population present in the first surface of the glass article. In some embodiments, the glass article is etched to a depth less than or equal to about 25% and greater than or equal to about 5% of the maximum initial flaw depth $A_i$ of the flaw population present in the first surface of the of the glass article. In some other embodiments, the glass article may be etched to a depth less than or equal to about 20% and greater than or equal to about 5% of the maximum initial flaw depth $A_i$ of the flaw population present in the first surface of the of the glass article. In still other embodiments, the glass article is etched to a depth less than or equal to about 15% and greater than or equal to about 5% of the maximum initial flaw depth $A_i$ of the flaw population present in the first surface of the of the glass article. In some other embodiments, the glass article is etched to a depth less than or equal to about 25% and greater than or equal to about 10% of the maximum initial flaw depth $A_i$ of the flaw population present in the first surface of the of the glass article. In some other embodiments, the glass article may be etched to a depth less than or equal to about 20% and greater than or equal to about 10% of the maximum initial flaw depth $A_i$ of the flaw population present in the first surface of the of the glass article. In still other embodiments, the glass article is etched to a depth less than or equal to about 15% and greater than or equal to about 10% of the maximum initial flaw depth $A_i$ of the flaw population present in the first surface of the of the glass article.

In embodiments, the etching solution comprises a mixture of hydrofluoric acid having a first molarity and at least one mineral acid with a second, different molarity. The molarity of the hydrofluoric acid and the molarity of the mineral acid(s) are selected to satisfy a predetermined relationship to facilitate uniform etching of the glass article. Specifically, the hydrofluoric acid is included in the etching solution to facilitate the dissolution of $SiO_2$ from the glass network. The mineral acid(s) are included in the mixture and specifically selected to facilitate the dissolution of other constituent components of the glass network. For example, for glasses with high concentrations of MgO and/or CaO, hydrochloric acid may be used to dissolve these components of the glass network. However, it has also been found that differences in the dissolution rate of the hydrofluoric and the mineral acid(s) may result in non-uniform removal of material from the glass article.

Specifically, it has been found that when the molarity of the at least one mineral acid is less than 3 times the molarity of the hydrofluoric acid, the mineral acid and the glass constituent components dissolved in the mineral acid form a gel layer (i.e., gelation) which coats the surface of the glass article and slows and/or inhibits further dissolution of material from the glass article, resulting in non-uniform material removal from the surface of the glass article. In situations where the glass article is etched to mitigate failure from flaws, as described herein, the gel layer may hinder modification of the crack tip morphology which, in turn, may result in a higher stress intensity factor at the crack tip and a greater propensity for failure from the flaw. For example, when a glass article is etched to remove flaws from a surface of the glass article, the gel layer resulting from a low-molarity mineral acid in the etching solution (that is, low molarity relative to the molarity of the hydrofluoric acid) may accumulate proximate the tip of the flaw, effectively closing off the tip and preventing further modification of the crack tip morphology.

However, it has been determined that when the molarity of the mineral acid(s) of the etching solution is greater than or equal to about 3 times the molarity of the hydrofluoric acid in the etching solution and less than or equal to about 6 times the molarity of the hydrofluoric acid in the etching solution, the etching solution does not form a gel layer on the surface (or within the flaws) of the glass article and, as such, glass material is removed from the surface of the glass article (and from within the flaws) at a substantially uniform rate. Accordingly, in the embodiments described herein, the molarity of the mineral acid(s) is greater than or equal to 3 times and less than or equal to 6 times the molarity of the hydrofluoric acid. That is, the second molarity is greater than or equal to 3 times and less than or equal to 6 times the first molarity.

In the embodiments described herein, the molarity of the hydrofluoric acid (i.e., the first molarity) is greater than or equal to 0.5 M and less than or equal to about 3.0 M and the molarity of the mineral acid (i.e., the second molarity) is from about 3 to about 6 times the first molarity to achieve a uniform dissolution and removal of material from the first surface of the glass article and adjacent to the flaws in the glass article.

In the embodiments described herein, the mineral acid includes at least one mineral acid other than hydrofluoric acid. For example, the mineral acid may include at least one of hydrochloric acid, nitric acid, phosphoric acid, sulfuric acid, boric acid, hydrobromic acid, and perchloric acid. In embodiments, the mineral acid may include more than one mineral acid. For example, a combination of mineral acids may be used to affect the uniform dissolution and removal of a range of glass constituent components depending on the chemistry of the glass being etched.

In the embodiments described herein, the etching solution is suitable to uniformly dissolve and remove material from the first surface of the glass article at a rate of less than 10% of the mass of the glass article over a treatment time greater than or equal to about 90 minutes and less than or equal to about 360 minutes. This relatively low rate of material removal enhances the uniformity of material removal while minimizing the overall amount of material removed and reducing the stress intensity factor at the tip of each flaw in the flaw population present in the glass article.

In one embodiment, the etching solution used in the chemical processing may comprise a mixture of 1 molar (1 M) hydrofluoric acid with 4 molar (4 M) hydrochloric acid in water. For example, in one embodiment, the etching solution may comprise a solution of 3.4% 1M HF by volume, 33.3% 4M HCl by volume, with the balance being water (e.g., a solution of 136 mL of 1M HF, 1332 mL of 4M HCl and 2532 mL $H_2O$).

In embodiments, the etching solution and the glass article are at ambient temperature (e.g., at a temperature of 25° C.) when brought into contact with one another. However, the temperature of the etching solution may be varied (i.e., increased or decreased) to control the rate at which glass material is removed from the glass article.

In embodiments, the glass article may be contacted with the etching solution for a treatment time less than or equal to 360 minutes. In some embodiments, the glass article may be contacted with the etching solution for a treatment time less than or equal to 270 minutes, or even less than or equal to 180 minutes. In some other embodiments the glass article may be contacted with the etching solution for a treatment time less than or equal to 90 minutes or even less than or equal to 60 minutes. In some embodiments, the glass article may be contacted with the etching solution for a treatment time greater than or equal to 60 minutes or even 90 minutes and less than or equal to 360 minutes. In some other embodiments, the glass article may be contacted with the etching solution for a treatment time greater than or equal to 60 minutes or even 90 minutes and less than or equal to 270 minutes. In some other embodiments, the glass article may be contacted with the etching solution for a treatment time greater than or equal to 60 minutes or even 90 minutes and less than or equal to 180 minutes. In still other embodiments, the glass article may be contacted with the etching solution for a treatment time greater than or equal to 60 minutes and less than or equal to 90 minutes.

In one particular embodiment where the etching solution is a mixture of 3.4% 1M HF by volume and 33.3% 4M HCl by volume in water at a temperature of 25° C., the glass article is contacted with the etching solution for a treatment time which is greater than or equal to 90 minutes in order to facilitate removal of material in the crack affected zone 104. In this embodiment, the treatment time may be less than or equal to 360 minutes. That is, the treatment time may be from about 90 minutes to about 360 minutes. However, it should be understood that the treatment time may be varied according to the specific etching solution, the temperature of the etching solution, and the glass composition of the glass article. It should also be understood that the treatment time may be varied depending on the maximum initial flaw depth $A_i$ of the flaw population within the glass article. That is, flaw populations which have a greater maximum initial flaw depth $A_i$ may require longer etching time to complete the selective removal of material from the surface to the crack tip.

Figure 5:
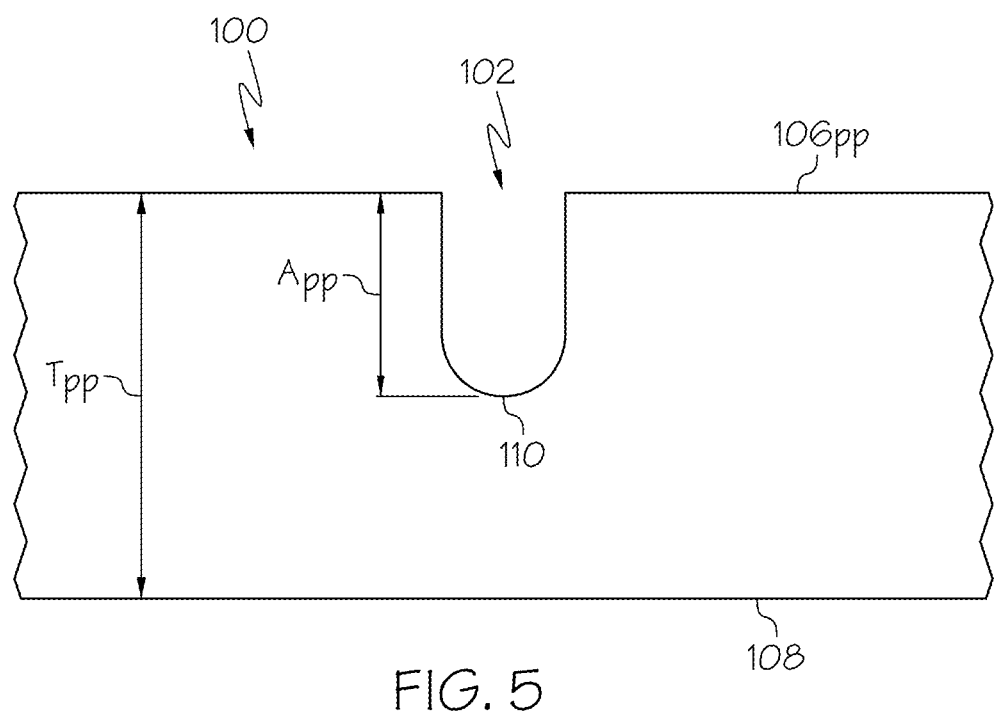
FIG. 5 schematically depicts a portion of a glass article with a flaw after chemical processing.
Figure 6B:
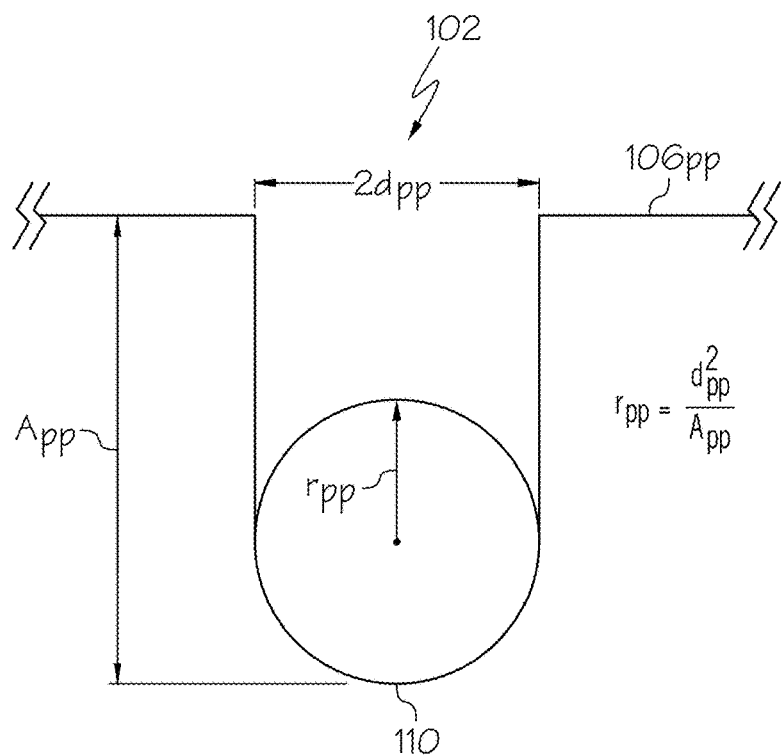
FIG. 6B schematically depicts a close-up view of the flaw of FIG. 2.

Referring now to FIGS. 5 and 6B, after the selective removal of glass material from along the initial maximum flaw depth $A_i$ in the crack affected zone 104, the glass article 100 still includes at least a portion of the flaws present in the initial flaw population, including at least those flaws which had the maximum initial flaw depth $A_i$. That is, in embodiments where glass material is removed from along the depth of the flaw by etching, the etching treatment is not sufficiently aggressive to completely remove material from the first surface 106 of the glass article 100 to a depth greater than the initial maximum flaw depth $A_i$. Following the etching treatment, the post-processing thickness of the glass article may be $T_{pp}$. In embodiments, the post-processing thickness $T_{pp}$ is less than or equal to the initial thickness $T_i$. In some embodiments, the etching treatment is selected to minimize the removal of material from the first surface 106 of the glass article 100 such that the post-processing thickness $T_{pp}$ is as close to the initial thickness $T_i$ as possible. That is, the change in thickness $\Delta T = (|T_i - T_{pp}|)$ is minimized.

As noted above, the material in the crack affected zone 104 may be more susceptible to dissolution upon exposure to an etching solution than the glass material in the bulk of the glass article 100, including the glass material at the first surface 106 of the glass article. After the etching treatment, each flaw 102 in the flaw population has a depth which is less than or equal to the maximum post-processing flaw depth $A_{pp}$ measured from the processed first surface 106pp of the glass article to the tip 110 of the flaw 102. In some embodiments described herein, the maximum post-processing flaw depth $A_{pp}$ is greater than or substantially equal to the maximum initial flaw depth $A_i$. That is, in some embodiments, the maximum initial flaw depth $A_i$ may actually increase as a result of the chemical processing treatment. While not wishing to be bound by theory, it is believed that this increase may be due to the difference in the solubility of the glass material in crack affected zone 104 (FIG. 4), including the material surrounding the tip 110 of the flaw 102, and the solubility of the glass material in the bulk of the glass article 100 and, in particular, the solubility of the glass material at the first surface 106 of the glass article 100. Thus, the difference $\Delta A$ between the maximum post-processing flaw depth $A_{pp}$ and the maximum initial flaw depth $A_i$ may be greater than or substantially equal to the change in thickness $\Delta T$. That is $(|T_{pp} - T_i|) \leq (|A_{PP} - A_i|)$.

The chemical processing treatment also increases the width of the flaw 102 as well as the radius of curvature of the flaw 102 at the tip 110. That is, after the chemical processing treatment, each flaw 102 remaining in the flaw population has a post-etching width $2d_{pp}$ which is greater than the initial width $2d_i$. Similarly, the post-processing radius $r_{pp}$ of the tip 110 of each flaw 102 remaining in the flaw population after chemical processing is greater than the initial radius $r_i$ of the flaw 102. That is $d_{pp}^2/A_{pp}$ is greater than $d_i^2/A_i$.

As noted above, the stress intensity factor Kt of a flaw is inversely proportional to the radius of the flaw at its tip. Thus, increasing the radius of the flaw 102 at the tip 110 through chemical processing decreases the stress concentration factor Kt. Specifically, the post-processing stress concentration factor $Kt_{pp}$ of the flaw 102 after chemical processing, such as after exposure to an etching treatment, is less than the initial stress concentration factor $Kt_i$ of the flaw 102 prior to chemical processing (i.e., $Kt_{pp} < Kt_i$). This means that, after chemical processing, any flaws remaining in the flaw population have a lower propensity for propagating through the thickness of the glass article 100 and, as a result, mechanical failure of the glass article 100 is mitigated and the reliability of the glass article 100 is improved.

Said differently, prior to chemical processing (e.g., prior to exposure to an etching treatment), the glass article 100 has an initial failure probability $P_i$. After chemical processing (e.g., after exposure to the etching treatment), the glass article has a post-processing failure probability $P_{pp}$ which is less than the initial failure probability $P_i$ despite the fact that at least a portion of the flaws in the flaw population remain in the glass article 100 after exposure to the etching treatment, such as those flaws which initially had the maximum initial flaw depth $A_i$, and the maximum initial flaw depth $A_i$ has been increased to $A_{pp}$. This reduction in the failure probability after chemical processing is due, at least in part, to the change in the morphology of the flaw 102 along its depth and at the tip 110 of the flaw 102.

In embodiments, after the glass article has been chemically processed by exposure to the etching solution such that the glass article is etched to a depth less than or equal to 25% of the maximum initial flaw depth Ai, the uniaxial compressive strength of the chemically processed glass article is substantially the same as the uniaxial compressive strength of a glass article etched to the maximum initial flaw depth of Ai under the same uniaxial compression loading condition.

As noted above, the width $2d_{pp}$ of the flaw 102 increases as a result of chemical processing, exposing the fracture faces of the flaw, which faces are now roughly parallel to one another. While not wishing to be bound by theory, it is believed that the increased width of the flaw 102 allows for other processing fluids to penetrate into the depth of the flaw 102 to the tip 110. For example, the glass article 100 may be ion-exchange processed in a molten salt bath after chemical treatment in order to introduce a layer of compressive stress in at least the first surface 106pp of the glass article 100. While not wishing to be bound by theory, it is believed that the increased width of the flaw after chemical processing may allow the molten salt of the salt bath to penetrate to the tip 110 of the flaw 102 such that at least the tip 110 of the flaw 102 is in compression, further improving the strength of the glass article 100 with the existing flaw population. This may also provide remediation of flaws that would normally extend beyond the depth of the compressive layer achieved by ion-exchange processing as the tips of such flaws are placed in compression.

The methods described herein can be utilized to reduce the Weibull strength distribution variability in a population of glass articles, mitigating the probability of mechanical failure of the glass articles under similar loading conditions, and improving the reliability of the glass articles over their lifetime. That is, a reduction in the Weibull strength distribution variability of a population of glass articles utilizing the methods described herein can increase the ultimate reliability of the glass articles as the glass articles are subjected to randomly applied loading events during their intended lifetime.

Specifically, the methods described herein increase the low end of the Weibull strength distribution to more closely match the high end of the Weibull strength distribution by reducing the stress concentration factor at the tip of flaws in the flaw population without removing all the flaws in the flaw population. As such, the variability in the Weibull strength distribution is reduced across the population of glass containers which, in turn, enables an increased allowable applied loading event magnitude during the lifetime of the glass containers. Said differently, by reducing the propensity for failure from low strength outliers (e.g., those flaws having the maximum initial flaw depth $A_j$), the reliability of the population of glass articles is increased by preventing breakage of the glass articles from known applied loading events. This approach to damage mitigation can be tailored to ensure ultra-high reliability glass articles by eliminating known failure mode root causes.

In terms of Weibull statistics, this increase in the reliability of a population of glass articles by decreasing the variability in the Weibull strength distribution (i.e., decreasing the width of the strength distribution) and increasing the magnitude of the distribution means an increase in Weibull modulus as well as an increase in characteristic strength of the population of glass articles for a known flaw source, each of which may be achieved by the methods described herein which effectively reduce the stress concentration factor at the tip of a flaw and increase the strength of the glass article. Using the methods described herein, those flaws which have the maximum initial flaw depth $A_i$ are modified to have a reduced stress concentration factor without removing the flaws from the glass article. The reduction in the stress concentration factor effectively reduces the stress magnitudes required to propagate any given flaw remaining in the glass article after treatment, thereby reducing the variability in observed strength.

The reduction in the failure probability after chemical processing can be equated to the failure probability of a flaw-free glass body or article. Specifically, the Weibull strength distribution of the glass body or article after chemical processing can be related to the theoretical Weibull strength distribution of a flaw-free glass body or article. The theoretical Weibull strength distribution of the flaw-free glass article may be calculated for a given loading condition (such as uniaxial compressive loading as described herein) using fracture mechanics. In the embodiments described herein, the actual Weibull strength distribution of the glass article following chemical processing and under uniaxial compressive loading is within 10% of the theoretical Weibull strength distribution of a flaw-free glass article under the same loading conditions. That is, if the flaw-free glass article has a theoretical Weibull strength distribution of X for the applied uniaxial compressive loading condition, the chemically processed glass article will have an actual Weibull strength distribution that is greater than or equal to 90% of the theoretical Weibull strength distribution of the flaw-free glass article under the same loading conditions. In some embodiments described herein, the actual Weibull strength distribution of the glass article following chemical processing and under uniaxial compressive loading is within 5% of the theoretical Weibull strength distribution of a flaw-free glass article under the same loading conditions. In some other embodiments, the actual Weibull strength distribution of the glass article following chemical processing and under uniaxial compressive loading is within 2% of the theoretical Weibull strength distribution of a flaw-free glass article under the same loading conditions.

EXAMPLES

The embodiments described herein will be further clarified by the following example.

Example 1

In order to demonstrate the increased reliability of glass articles processed according to the methods described herein, a laboratory scale experiment was set up to compare the load-to-failure distribution of a population of untreated glass articles with the load-to-failure distributions of populations of glass articles treated according to the methods described herein.

Six populations of glass articles were initially subjected to elastically derived frictive contact damage under identical conditions in order to effectively eliminate the existing damage history of each population. The glass articles consisted of 3 ml round-form glass vials. The elastically derived frictive contact damage essentially is a damage introduction event where the localized stress magnitude exceeds that of the surface strength of the glass article and a deep (>100 micron) flaw is introduced. In particular, each population of glass articles was subjected to glass-on-glass frictive contact using the vial-on-vial testing jig described at paragraphs [00140]-[00142] and shown in FIG. 1 of pending U.S. patent application Ser. No. 13/780,740, filed Feb. 28, 2013 and entitled "Glass Articles With Low-Friction Coatings" in order to induce damage in the surface of the glass article. The frictive damage imparted to each population was done so under an applied load of 6 N.

Figure 7:
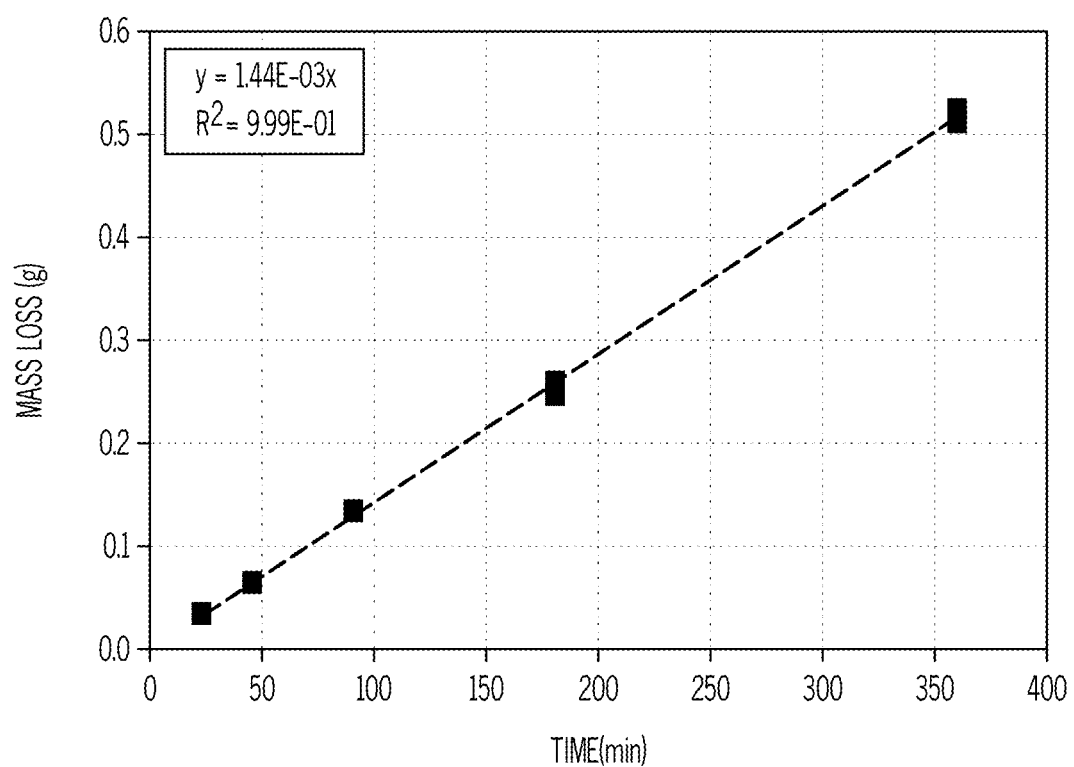
FIG. 7 graphically depicts the mass loss as a function of time for a glass article etched with a solution of 1 M hydrofluoric acid and 4 M hydrochloric acid.

Following the introduction of elastically derived frictive damage, a first population of glass articles was segregated from the remaining populations and was not subjected to any further processing (i.e., the "No Processing" population). The remaining populations were subjected to chemical processing in which each population was placed in a circulating bath consisting of a mixture of 3.4% 1M HF by volume and 33.3% 4M HCl by volume in water. The temperature of the bath was 25° C. The second population of glass articles was placed in the bath for 22.4 minutes; the third population of glass articles was placed in the bath for 45 minutes; the fourth population was placed in the bath for 90 minutes; the fifth population of glass articles was placed in the bath for 180 minutes; and the sixth population of glass articles was placed in the bath for 360 minutes. Each glass article was weighed before exposure to the etching solution. Upon removal from the bath, each population was rinsed and dried and each glass article in each population was again weighed so that the mass loss due to exposure to the etching solution could be determined based on the pre- and post-etching mass. Table 1 below shows the target etch time, actual etch time, average mass loss, and calculated removal depth for each of the populations. FIG. 7 graphically depicts the average mass loss (y-axis) as a function of etching time (x-axis) for the second through sixth populations. As can be seen in FIG. 7, use of the combination of 1M HF and 4M HCl (i.e., an etching solution in which the molarity of the mineral acid is 3-6 times the molarity of the hydrofluoric acid) resulted in the uniform removal of glass material as a function of time. That is, the rate of material did not decrease with increasing time due to the gelation of the etching solution. It is noted that the depth of the material removed from the surface of the glass article in each population was less than the maximum initial flaw depth $A_i$ (i.e., less than 100 μm).

TABLE 1

Etching Data

| Etch Time Range (min) | Actual Etch Time (min) | Average Mass Loss (g) | Calculated Removal Depth (μm) |
|---|---|---|---|
| 0 | 0 | 0 | 0 |
| 21.7-22.7 | 22.4 | 0.0366 | 7 |
| 43.5-45.5 | 45 | 0.0662 | 12 |
| 87.0-90.9 | 90 | 0.135 | 25 |
| 173.9-181.8 | 180 | 0.255 | 47 |
| 347.8-353.6 | 360 | 0.518 | 96 |

Figure 8A:
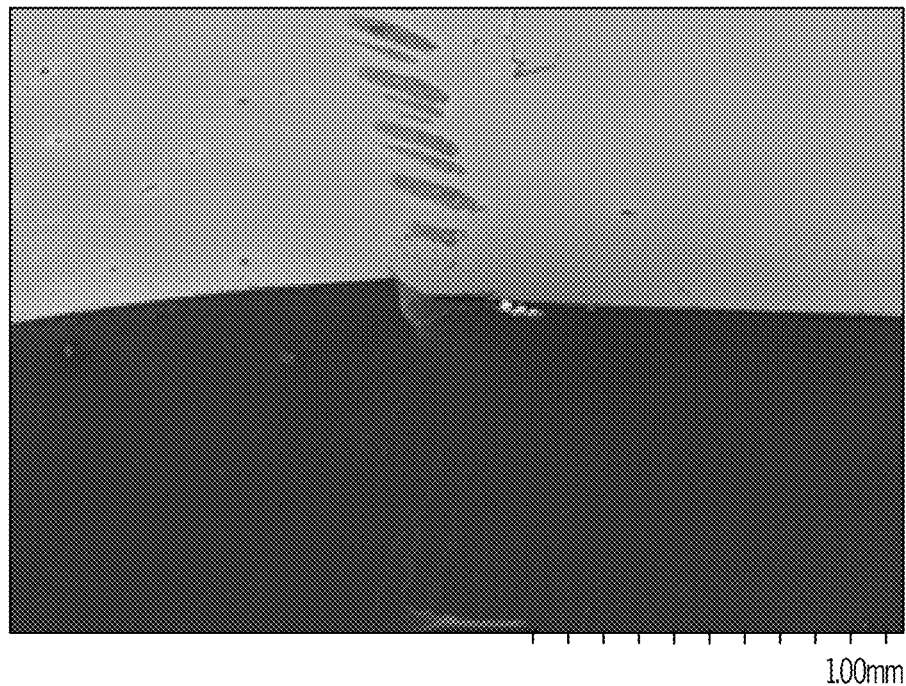
FIGS. 8A and 8B are SEM micrographs depicting a fracture surface and failure origin of an untreated glass article.
Figure 8B:
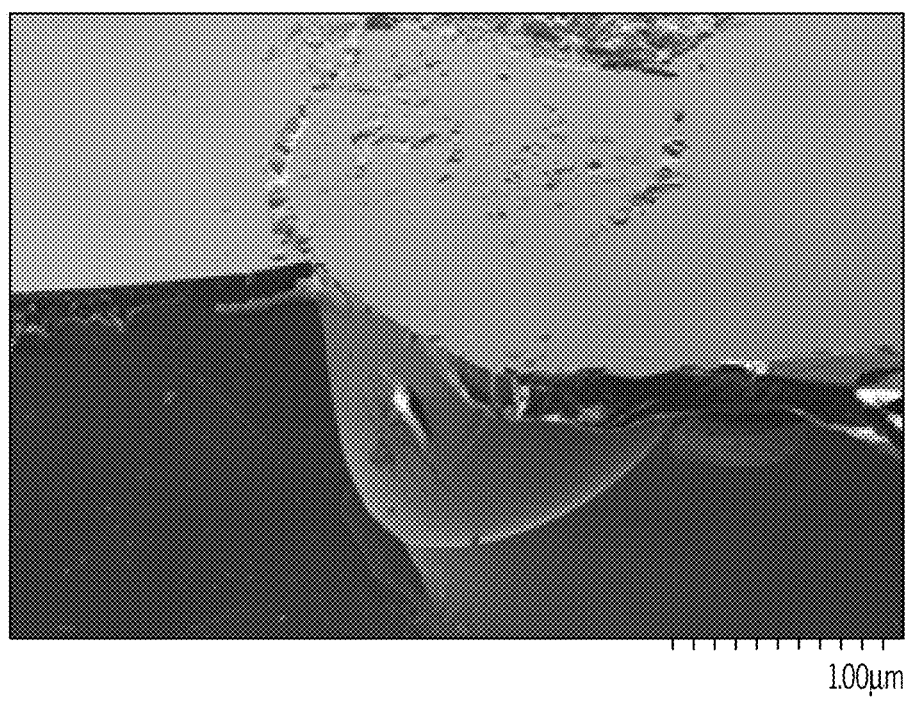
Figure 9A:
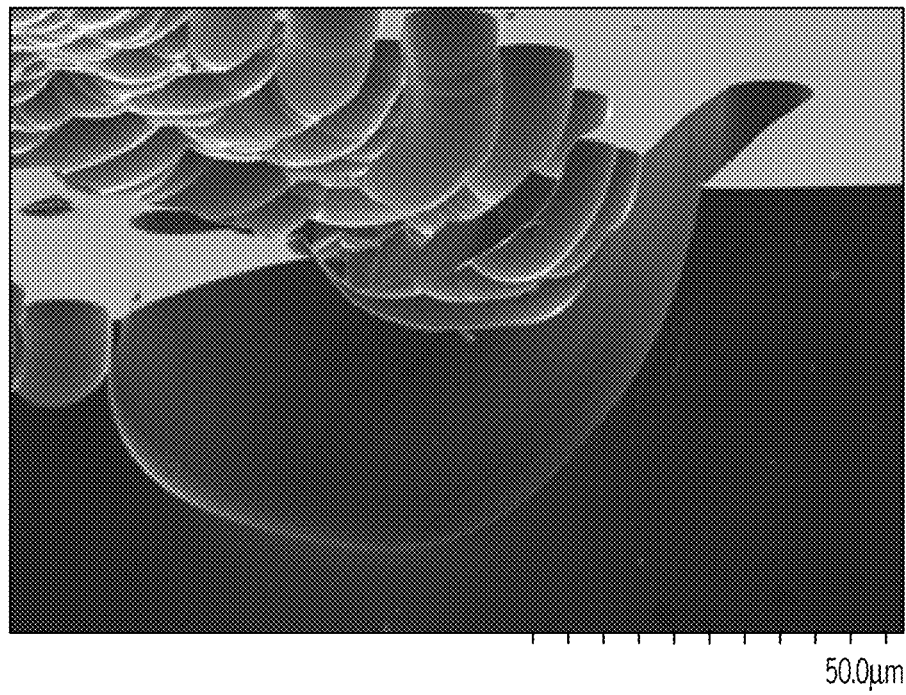
FIGS. 9A and 9B are SEM micrographs depicting a fracture surface and failure origin of a chemically processed glass article.
Figure 9B:
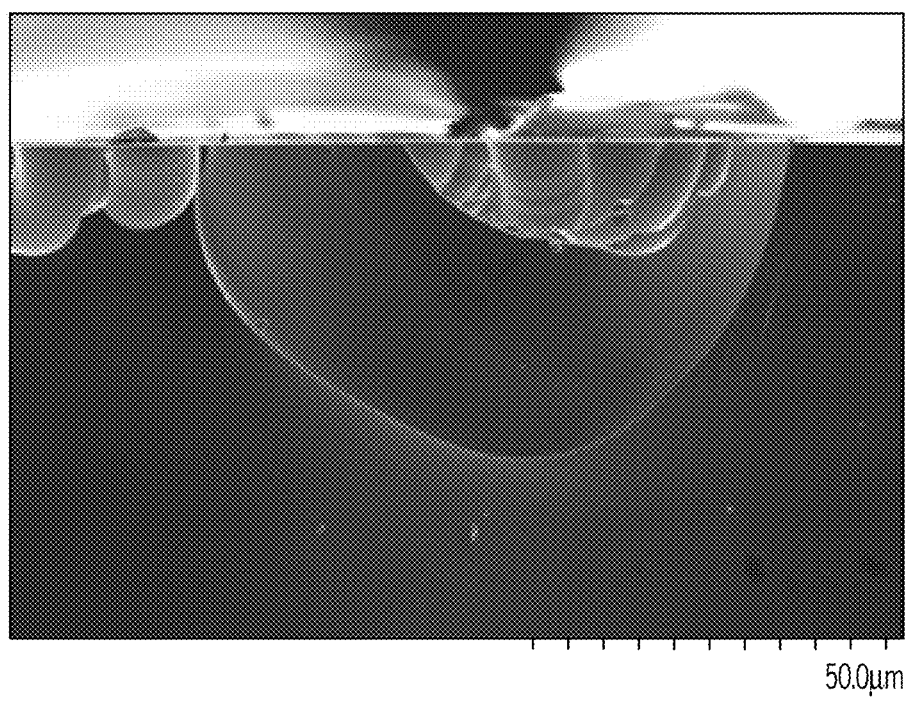
Figure 10A:
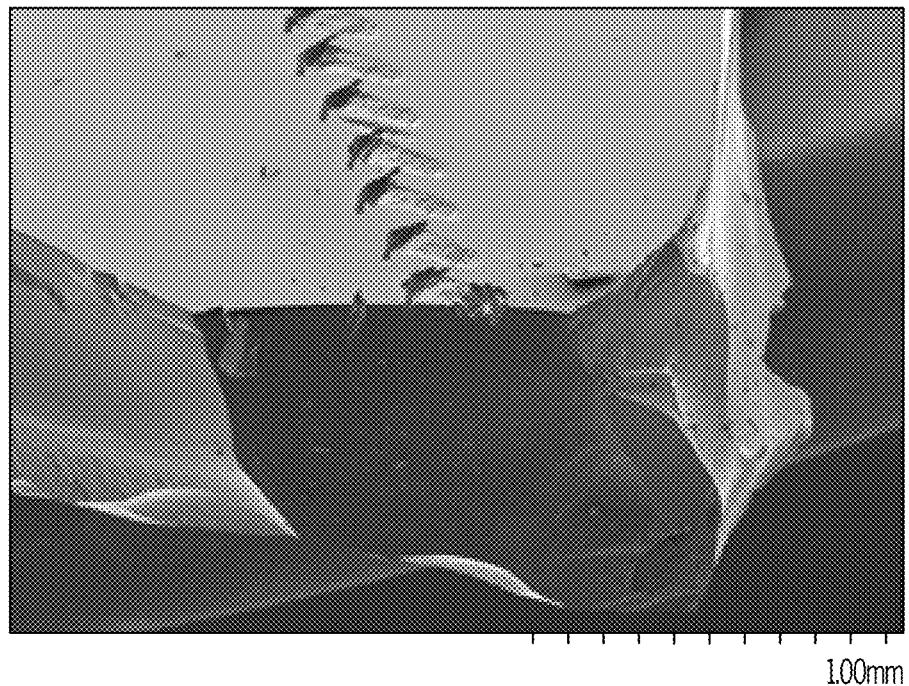
FIGS. 10A and 10B are SEM micrographs depicting a fracture surface and failure origin of a chemically processed glass article.
Figure 10B:
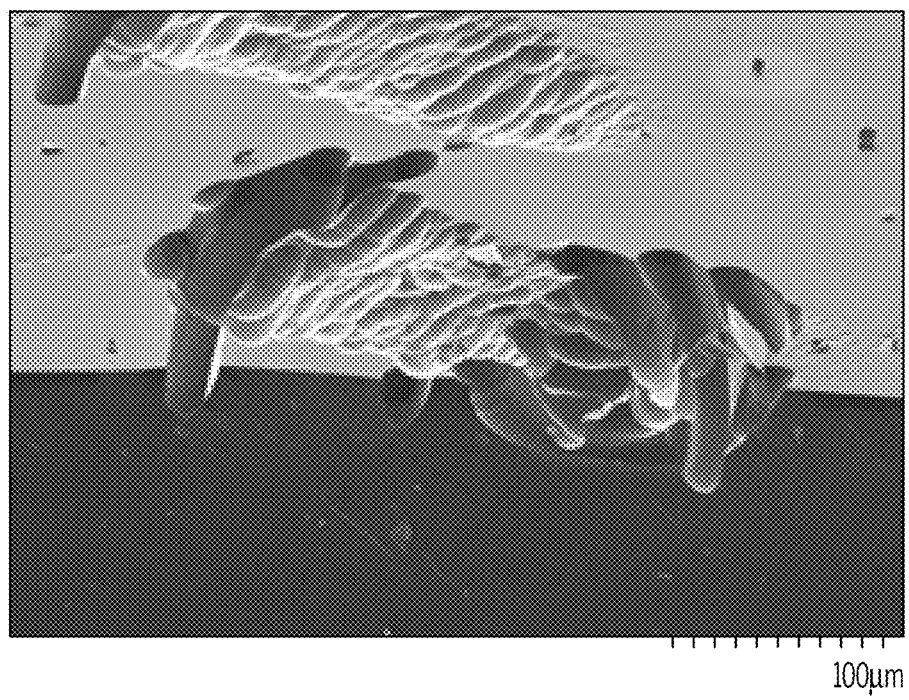
Figure 11A:
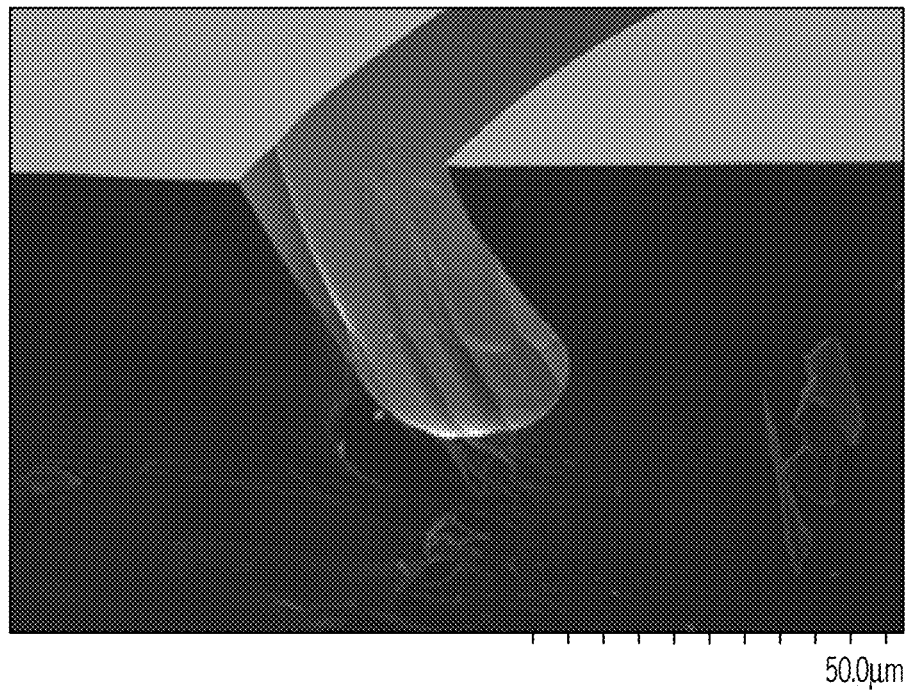
FIGS. 11A and 11B are SEM micrographs depicting a fracture surface and failure origin of a chemically processed glass article.
Figure 11B:
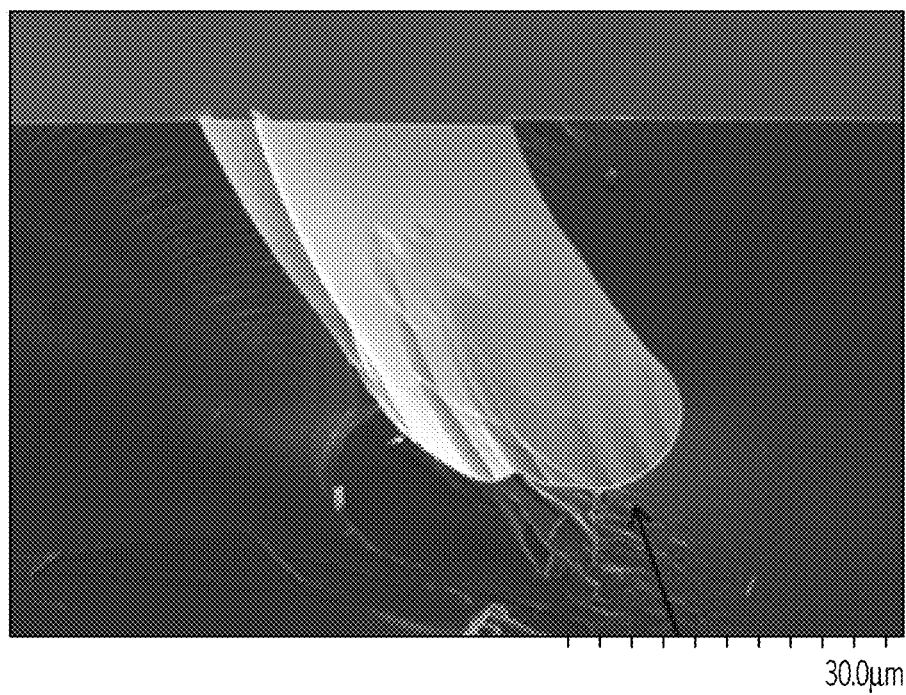

Thereafter, each of the first through sixth populations were tested in uniaxial compression until failure using a horizontal compression test apparatus as described at paragraph [00149] of pending U.S. patent application Ser. No. 13/780,740, filed Feb. 28, 2013 and entitled "Glass Articles With Low-Friction Coatings." FIGS. 8A and 8B are SEM micrographs depicting a failure origin of one glass article from the "No Processing" population. FIGS. 9A-11B are SEM micrographs showing the modified flaw morphology of glass articles from the populations subjected to chemical processing. In each case, the etching treatment resulted in a rounding of the tip of the flaw which is believed to have improved the load bearing capability of the glass article.

Figure 12:
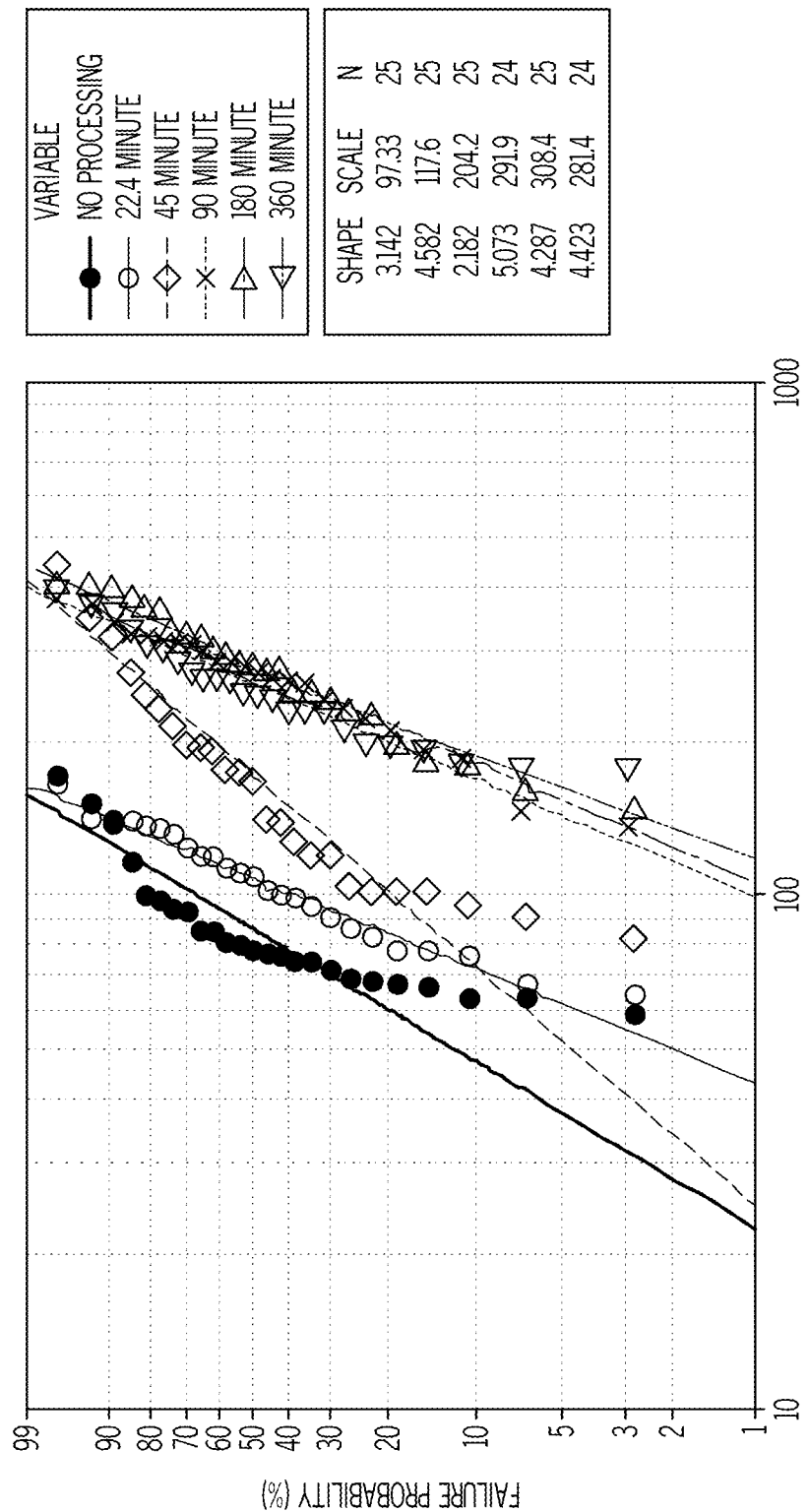
FIG. 12 graphically depicts the Weibull strength distribution (y-axis) as a function of the load at failure (x-axis) for untreated glass articles and chemically processed glass articles.

The load at failure for each glass article in each population is plotted in FIG. 12. As shown in FIG. 12, the populations of glass articles treated in the etching solution for 22.4 minutes and 45 minutes had an observable increase in the failure load relative to the "No Processing" population while the populations of glass articles treated in the etching solution for 90 minutes, 180 minutes, and 360 minutes had an even more pronounced increase in the failure load relative to the "No Processing" population. Table 2 below shows the failure load distribution improvement (%) relative to the "No Processing" population for each population of glass articles subjected to the etching treatment.

TABLE 2

Failure Load Distribution Improvement

| Processing Time (min) | Failure Load Distribution Improvement (%) |
|---|---|
| 22.4 | 74.0896 |
| 45 | 89.6235 |
| 90 | 99.4279 |
| 180 | 99.3101 |
| 360 | 99.6965 |

As shown in FIG. 12 and Table 2, a marked improvement in load bearing capability was achieved for those glass articles subjected to the etching treatment for greater than or equal to 90 minutes relative to the "No Processing" population or even the population subjected to the etching treatment for 45 minutes. In each case, the improvement in the failure load distribution was greater than 99% of the load to failure distribution for the "No Processing" population demonstrating that the etching treatment was effective for improving the reliability of the glass containers in these populations.

Figure 13:
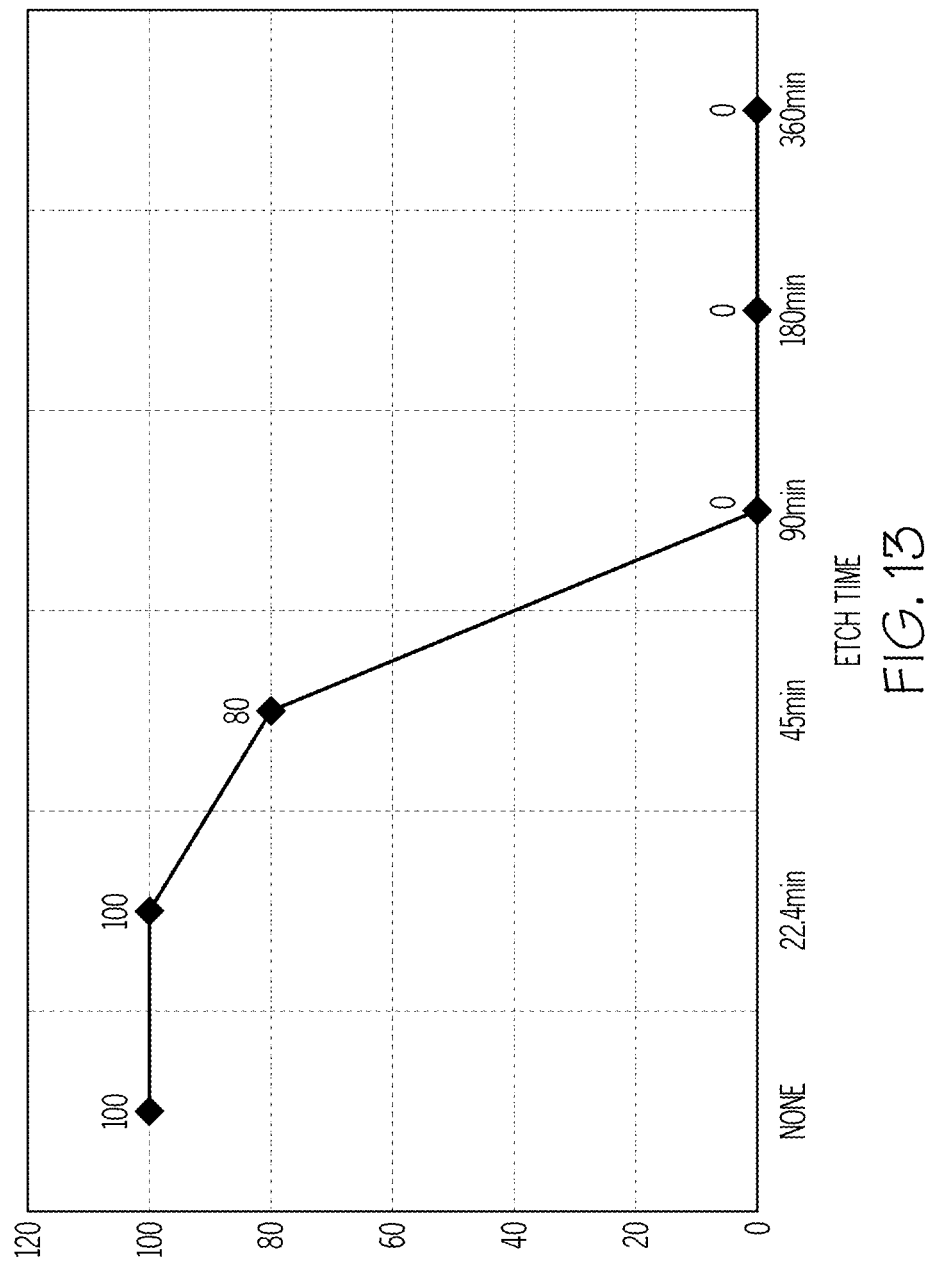
FIG. 13 graphically depicts the percentage of uniaxial compression failures occurring in the induced damage (y-axis) as a function of chemical processing time (x-axis).

It is also noted that only minimal improvement in load bearing capability was observed for those glass articles subjected to the etching treatment for greater than 90 minutes. For example, FIG. 13 graphically depicts the percentage of uniaxial compression failures (y-axis) as function of etch time (x-axis). As shown in FIG. 13, the number of failures from the induced damage was 100% for the "No Processing" population and the population treated at 22.4 minutes. However, for treatments of 90 minutes or greater, the failures in uniaxial compression occurred outside of the induced damage, indicating that the etching treatment was successful in mitigating failure from the induced damage. This data indicates that the strength of the glass container can be restored to almost its theoretical maximum (i.e., the strength of a glass container with no flaws) without completely removing the entire flaw population, as is done in conventional practices. Indeed, the data demonstrates that less aggressive chemical processing treatments which remove a relatively small percentage of material can be as effective in restoring the strength of a glass article as more aggressive chemical treatments which completely remove the flaw population.

It should now be understood that the methods described herein are effective for mitigating mechanical failure in glass articles and improving the reliability of the glass articles without removing the entire flaw population from the glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A glass article comprising:
   a glass body comprising a first surface and a second surface opposite the first surface, the first surface and the second surface each having a radius of curvature;
   the first surface of the glass body comprising a flaw population extending from the first surface into a thickness of the glass body with a maximum initial flaw depth Ai, wherein:
   the first surface of the glass body is etched to a depth less than or equal to about 25% of the maximum initial flaw depth Ai of the flaw population present in the first surface;
   the flaw population of the first surface is etched to selectively remove material adjacent to each flaw of the flaw population along the maximum initial flaw depth Ai;
   under uniaxial compressive loading, at least a portion of the first surface is in tension and a uniaxial compressive strength of the glass article is greater than or equal to 90% and less than 100% of a uniaxial compressive strength of a flaw-free glass article; and
   the glass article is chemically processed by contacting the first surface of the glass article with an etching solution, wherein the etching solution comprises a mixture of hydrofluoric acid having a first molarity from 0.5 M to 3.0 M and at least one mineral acid having a second molarity that is 3 to 6 times the first molarity; and the etching solution uniformly removes glass material from the external surface of the glass article and adjacent to each flaw in the flaw population without creating a gel layer.

2. The glass article of claim 1, wherein a uniaxial compressive strength of the glass article is greater than or equal to 95% of a uniaxial compressive strength of a flaw-free glass article.

3. The glass article of claim 1, wherein a uniaxial compressive strength of the glass article is greater than or equal to 98% of a uniaxial compressive strength of a flaw-free glass article.

4. The glass article of claim 1, wherein a Weibull strength distribution of the glass article is within 10% of a calculated Weibull strength distribution of a flaw-free glass article.

5. The glass article of claim 1, wherein a Weibull strength distribution of the glass article is within 5% of a calculated Weibull strength distribution of the flaw-free glass article.

6. The glass article of claim 1, wherein the first surface of the glass article is etched to a depth greater than or equal to about 5% of the maximum initial flaw depth Ai of the flaw population present in the first surface.

7. The glass article of claim 1, wherein the glass article is a glass container and the first surface of the glass article is an external surface of the glass container and the second surface is an internal surface of the glass container.

8. The glass article of claim 7, wherein the glass container is a pharmaceutical package.

9. The glass article of claim 1, wherein the glass article is formed from an alkali-aluminosilicate glass composition.

\* \* \* \* \*